United States Patent
McCracken

[11] Patent Number: 5,642,008
[45] Date of Patent: Jun. 24, 1997

[54] POWER TOOL MOTOR ASSEMBLY

[75] Inventor: Robert E. McCracken, Tucson, Ariz.

[73] Assignee: Waxing Corporation of America, Inc., Elmhurst, Ill.

[21] Appl. No.: 545,995

[22] Filed: Oct. 20, 1995

[51] Int. Cl.$^6$ ............................................. H02K 5/04
[52] U.S. Cl. ........................ 310/50; 310/89; 310/68 D; 451/357
[58] Field of Search ........................ 310/50, 68 D, 310/67 R, 68 R, 89; 451/357; 15/97.1

[56] References Cited

U.S. PATENT DOCUMENTS

| | | | |
|---|---|---|---|
| D. 221,129 | 7/1971 | Hutchins | D8/2 |
| D. 252,731 | 8/1979 | Parise | D8/62 |
| D. 270,515 | 9/1983 | Dunlap | D8/67 |
| D. 273,079 | 3/1984 | Ibaraki | D8/62 |
| D. 277,638 | 2/1985 | Somers | D8/62 |
| D. 332,558 | 1/1993 | Hoshino et al. | D8/62 |
| D. 336,229 | 6/1993 | Bunyea | D8/62 |
| D. 337,499 | 7/1993 | Matsunaga et al. | D8/62 |
| D. 349,789 | 8/1994 | Bunyea | D32/19 |
| 1,259,609 | 3/1918 | Denhard . | |
| 1,929,662 | 10/1933 | Wappat | 200/157 |
| 2,544,343 | 3/1951 | Miller | 173/322 |
| 2,597,971 | 5/1952 | Burnham | 15/97 |
| 2,759,305 | 8/1956 | Helbig | 51/170 |
| 3,401,416 | 9/1968 | Ziegler | 15/49 |
| 3,536,943 | 10/1970 | Bowen et al. | 310/50 |
| 3,652,879 | 3/1972 | Plunkett et al. | 310/50 |
| 3,770,331 | 11/1973 | Sellers et al. | 310/50 |
| 3,780,246 | 12/1973 | Beckering et al. | 200/157 |
| 3,793,782 | 2/1974 | Bowling | 51/170 PT |
| 3,849,943 | 11/1974 | Thomas et al. | 51/170 MT |
| 3,873,796 | 3/1975 | Worobec, Jr. | 200/157 |
| 3,924,147 | 12/1975 | Tarnow et al. | 310/68 |
| 4,066,133 | 1/1978 | Voss et al. | 173/12 |
| 4,122,320 | 10/1978 | Edgell et al. | 200/157 |
| 4,133,971 | 1/1979 | Boyd et al. | 174/46 |
| 4,216,630 | 8/1980 | Smart et al. | 51/170 T |
| 4,276,459 | 6/1981 | Willett et al. | 200/157 |
| 4,295,240 | 10/1981 | Lex | 15/22 R |
| 4,381,628 | 5/1983 | Dicke | 51/170 TL |
| 4,388,780 | 6/1983 | Rees | 51/128 |
| 4,404,488 | 9/1983 | Herr | 310/239 |
| 4,523,411 | 6/1985 | Freerks | 51/170 MT |
| 4,593,220 | 6/1986 | Cousins et al. | 310/50 |
| 4,730,134 | 3/1988 | Sistare | 310/50 |
| 4,799,282 | 1/1989 | Fischer | 15/98 |
| 4,858,271 | 8/1989 | Berfield et al. | 15/339 |
| 4,866,804 | 9/1989 | Masbruch et al. | 15/49 R |
| 4,875,879 | 10/1989 | Bunyea et al. | 439/501 |
| 4,962,562 | 10/1990 | Englund et al. | 15/230.16 |
| 5,007,128 | 4/1991 | Englund et al. | 15/230.16 |
| 5,008,574 | 4/1991 | Kitahata | 310/68 D |
| 5,038,523 | 8/1991 | Farber et al. | 51/170 R |
| 5,136,130 | 8/1992 | Daly | 200/318.1 |

(List continued on next page.)

FOREIGN PATENT DOCUMENTS

3313704 A1  10/1984  Germany .
2 224 231    5/1990  United Kingdom .

Primary Examiner—Thomas M. Dougherty
Assistant Examiner—B. Mullins
Attorney, Agent, or Firm—Fitch, Even, Tabin & Flannery

[57] ABSTRACT

A motor assembly for driving a working element of a power tool which is provided includes first and second clamshell housing members connectable to define an interior space for the power tool motor and a longitudinal axis extending through the interior space. An armature includes a core and a rotatable shaft for driving a working element of the tool. The armature is mountable in the interior space with the rotatable shaft aligned along the longitudinal axis. A cylindrical stator yoke is mountable in the interior space about the longitudinal axis to encircle the armature. Top and bottom bearings are mounted on corresponding ends of the armature shaft. Alignment and support members on the first and second housing members are provided with the alignment and support members capturing and fixing the yoke and top and bottom bearings in the interior space in alignment about the longitudinal axis when the clamshell housing members are connected to each other.

17 Claims, 10 Drawing Sheets

U.S. PATENT DOCUMENTS

| | | | |
|---|---|---|---|
| 5,138,735 | 8/1992 | Kusz et al. | 15/97.1 |
| 5,185,964 | 2/1993 | Englund et al. | 51/281 R |
| 5,194,772 | 3/1993 | Matsushita | 310/71 |
| 5,231,727 | 8/1993 | Armbruster | 15/97.1 |
| 5,243,727 | 9/1993 | Tanaka et al. | 15/98 |
| 5,289,605 | 3/1994 | Armbruster | 15/97.1 |
| 5,309,594 | 5/1994 | Thompson | 15/97.1 |
| 5,318,158 | 6/1994 | Seasholtz | 191/12 R |
| 5,330,138 | 7/1994 | Schlessmann | 248/52 |
| 5,347,673 | 9/1994 | Nickels, Jr. | 15/97.1 |
| 5,349,785 | 9/1994 | Nickels, Jr. et al. | 451/357 |

POWER TOOL MOTOR ASSEMBLY

FIELD OF THE INVENTION

The present invention relates to housings for power tools and, more particularly, to such a housing which aligns and supports a motor in the housing for driving a working element of the power tool.

BACKGROUND OF THE INVENTION

Typically, permanent magnet direct current electric motors for power tools have a frame, an armature including the core and associated windings, and commutator and brush assemblies. The frame can be formed from a soft iron or steel yoke or can of open cylindrical shape mounted on a bearing base plate and closed at its top end by a cap plate. A rectifier can be provided for DC motors to convert alternating current into direct current for application to the coils of the armature mounted within the yoke. The rectifier is typically mounted remotely from the motor housing or to the outside of the housing, such as to a cap plate. Such a "can" type DC motor is assembled in a separate operation before being incorporated into the power tool with which it is to be used. Such preassembly or separate assembly operation gives rise to significant motor-related manufacturing costs. A second assembly operation is required to assemble the internal components of the power tool, including the preassembled motor, in the power tool housing. Thus, it is desirable for a power tool to be provided with a DC motor which does not require a separate assembly operation therefor and which can be incorporated into the assembly operation for the power tool itself.

U.S. Pat. No. 5,349,785 discloses a motor pre-assembly utilizing a support member onto which the armature is mounted by screwing down a lower roller bearing in a bearing well formed in the support member and through which one of the armature shaft ends is inserted. Additionally, the switch, printed circuit board, power cord and wiring are secured to the support member. With the armature secured to the plate by frictional forces between the shaft end and lower bearing, the motor support is turned upside down so as to be lowered into an upwardly opening bucket-shaped motor housing so that the other end of the armature shaft is aligned with and extends into an upper bearing secured in its bearing well formed in the bucket-shaped housing. The motor preassembly to the motor support member requires an extra manufacturing step and increased costs associated therewith. Incorporation of the motor pre-assembly into the polisher assembly also requires a careful alignment of the motor support carrying the armature during such assembly so that its shaft properly fits into the upper bearing when the armature is stacked in the bucket-shaped housing. In addition, the use of screws to secure the various internal components to the support increases the time, expense and complexity of assembly of the motor.

Besides the manufacturing costs associated with the separate assembly of "can" type DC motors, another problem with these motors is that provision must be made for the output leads on the rectifier such that they can be electrically connected to the brushes to supply direct current power to the armature coils. Generally, the rectifier is mounted near or on the frame as previously mentioned such that the leads must pass through the motor housing, such as through slots or apertures in the cap of the yoke. In another known direct current motor assembly, the top cap mounts a modified rectifier assembly which extends on either side of the cap so as to obviate the need to provide slots or apertures in the cap for the rectifier assembly leads. In both types of motor assemblies, specially dedicated structures, i.e., apertured caps and/or modified rectifier assemblies, must be provided to accept or accommodate the leads extending from the rectifier to the brushes.

SUMMARY OF THE INVENTION

In accordance with the present invention, a motor assembly for driving a working element of a power tool is provided which overcomes the aforementioned problems of the prior art.

In one form of the invention, the motor assembly includes first and second clamshell housing members which are connectable to define an interior space for the power tool motor and a longitudinal axis extending through the interior space. An armature includes a core and a rotatable shaft for driving a working element of the tool. The armature is mountable in the interior space with the rotatable shaft aligned along the longitudinal axis. A cylindrical stator yoke is mountable in the interior space about the longitudinal axis to encircle the armature. Top and bottom bearings are mounted on corresponding ends of the armature shaft. Alignment and support members on the first and second housing members are provided with the alignment and support members capturing and fixing the yoke and top and bottom bearings in the interior space in alignment about the longitudinal axis when the clamshell housing members are connected to each other. Thus, the above motor assembly provides for direct mounting of the motor components to the housing of the power tool so as to reduce the number of parts over conventional motors requiring motor housing members such as cap and bearing plates and associated frames to mount the motor components therein since the motor assembly herein utilizes the power tool housing to align and support the various motor components and, therefore, is not a separate assembly operation from that of the power tool housing and its internal components. The inventive power tool herein has all of its internal components, including the motor components, assembled in a single assembly operation thereby minimizing assembly costs.

Preferably, the alignment and support members can be formed integrally with the housing members. In one form, the alignment and support members include horizontal ledges having arcuate edges. With the housing members connected to each other, the ledges can extend from the first and second housing members towards the longitudinal axis with the arcuate edges defining a yoke capturing seat about the longitudinal axis in the interior space.

The cylindrical yoke can include a top end surface and a bottom end surface and the yoke capturing seat can include an upper of vertically aligned ledges of the housing members which extend over at least a portion of the top end surface and a lower pair of vertically aligned ledges of the housing members which extend below at least a portion of the bottom end surface with the housing members connected to each other to tightly capture the yoke between the upper and lower pairs of aligned capturing ledges against movement in an axial direction in the interior space. The yoke can include an outer cylindrical surface extending between the top end surface and the bottom surface. The arcuate edges can clampingly engage the yoke cylindrical surface with the housing members connected to each other to tightly capture the yoke between the arcuate edges against movement in a radial direction in the interior space.

In one form, the alignment and support members include bearing engaging members with vertically-aligned bearing engaging members cooperating to form top and bottom pockets having the longitudinal axis extending therethrough with the housing members connected to each other. The aligned bearing engaging members can capture the top and bottom bearings in the respective top and bottom pockets to align the armature shaft along the longitudinal axis and limit armature movement in the interior space.

A commutator can be mounted on the armature shaft between the top bearing and the armature core with a rectifier and brush assembly mounted in the interior space closely adjacent the commutator by the alignment and support members. The rectifier and brush assembly can include a U-shaped support plate having opposed leg portions and a transverse foot portion extending between the leg portions. A brush housing is provided on each leg portion spaced 180° from each other around the commutator. A rectifier well is formed in the foot portion, including locking means in the well for retaining the rectifier therein. The leg portions can each have outer cut-outs to define shoulder portions thereof. The alignment and support members on one of the housing members include a pair of spaced, shoulder receiving members with the shoulder receiving members defining notches for receipt of the shoulder portions therein to align and support the U-shaped plate closely adjacent the commutator.

In another form of the invention, a direct current motor assembly for driving a power tool is provided. The direct current motor assembly includes an electrical plug receptacle mounted to the housing members having terminals with portions exposed exteriorly of the housing for electrically connecting an alternating current power supply to the power tool. An armature having core windings and a rotatable shaft is mounted to the first and second housing members. A yoke carrying permanent magnets is mounted to the first and second housing members to encircle the armature. A commutator having an outer surface is mounted to the rotatable shaft spaced above the yoke. A pair of brushes for receiving a potential drop and for slidingly riding on the commutator outer surface as it rotates on the shaft are provided for electrically connecting the power supply to the armature windings. A rectifier is provided and has input terminals with one of the input terminals being electrically connected to one of the electrical plug receptacle terminals and has output terminals electrically connected to the pair of brushes for converting the alternating current from the power supply to direct current for application to the armature windings. A unitary support plate mounts the brushes and rectifier thereon with the plate being mounted in the housing interior space adjacent the commutator to allow the brushes to engage the commutator outer surface. By use of the support plate mounting both the rectifier and brushes adjacent the commutator, the need to provide for separate structure to accommodate the leads extending between the rectifier and brushes is eliminated.

The support plate can include a pair of brush housings mounted thereon. The brushes can be mounted in the housings and urged into contact exteriorly of the housings with the commutator outer surface. The support plate can have a U-shape having opposed leg portions and a transverse foot portion extending between the leg portions with the brush housing spaced 180° from each other around the commutator on each leg portion. The support plate can include a rectifier well formed therein for securely receiving and retaining the rectifier therein.

In one form, a switch is electrically connected to another one of the electrical receptacle terminals and to another one of the rectifier input terminals with the switch being operable to either activate or deactivate the power tool.

The support plate can include at least one lead guiding stake extending therefrom. Non-insulated braided lead wires can extend from each of the brushes with at least one of the wires directed around the stake to one of the rectifier output terminals to prevent the wires from contacting each other.

In one form, the armature rotatable shaft includes top and bottom bearings on respective ends thereof and the first and second housing members are clamshell housing members which are laterally moved into engagement with each other to be connected together and include integral extension ribs which cooperate to clamp and secure the yoke and the top and bottom bearings in the housing interior space.

DETAILED DESCRIPTION OF THE PREFERRED EMBODIMENT

Figure 1:
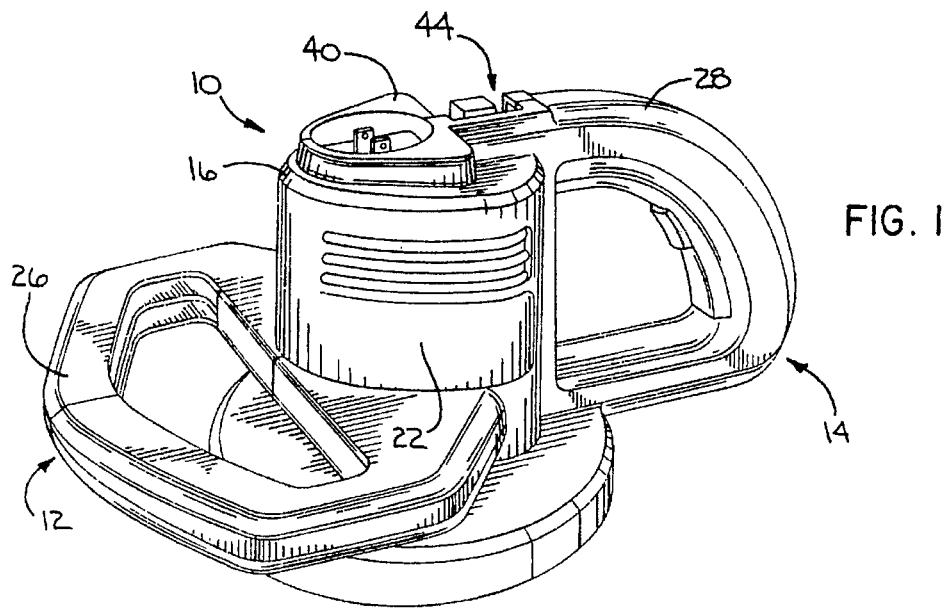
FIG. 1 is a perspective view of an apparatus for waxing, buffing, polishing or the like according to the present invention.
Figure 2:
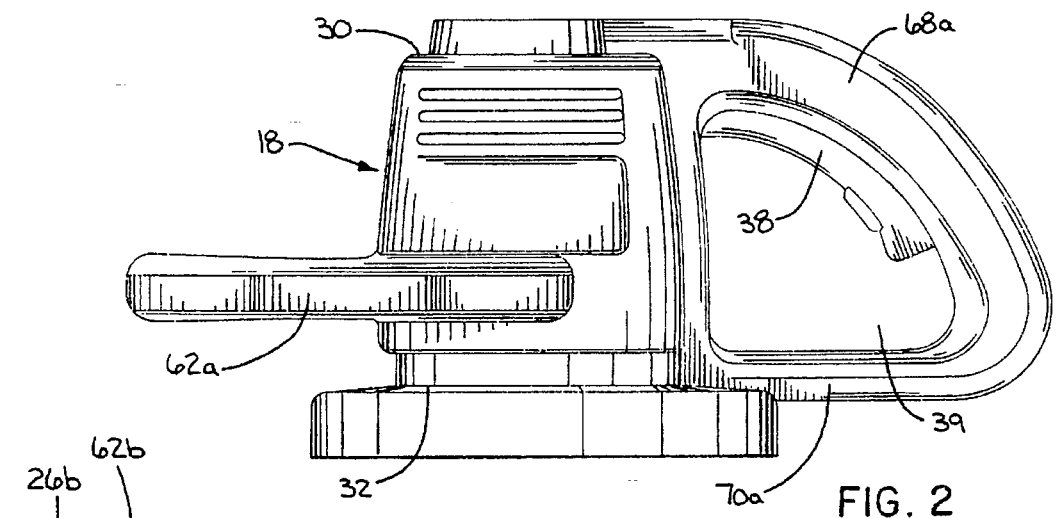
FIG. 2 is a left side elevational view of the apparatus shown in FIG. 1, including a front handle and a rear handle and a paddle actuator on the rear handle.
Figure 3:
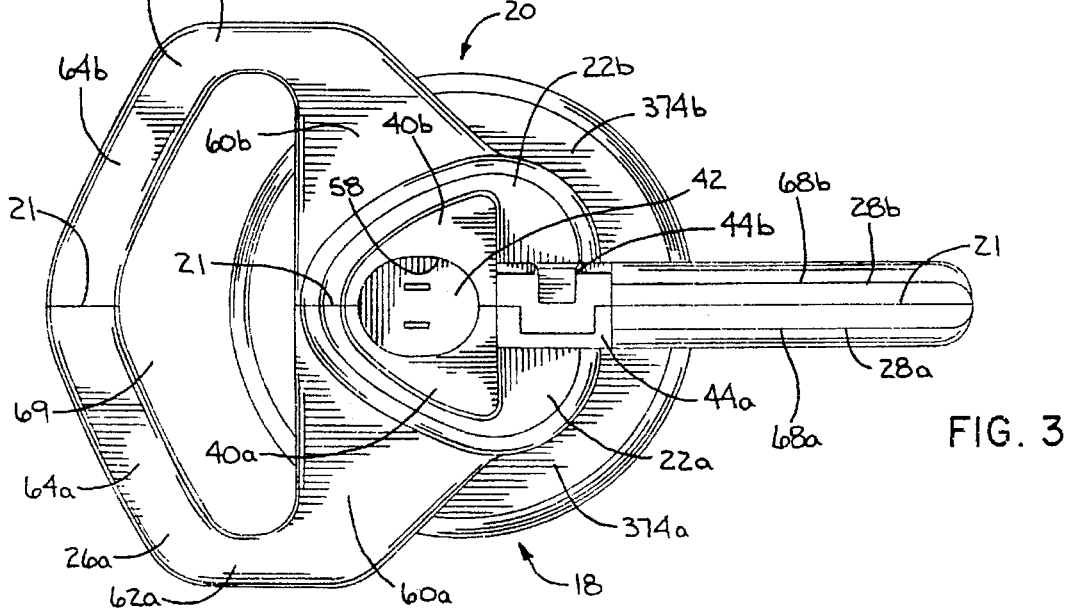
FIG. 3 is a top plan view of the apparatus shown in FIG. 1 showing details of the engagement of a first and a second clamshell housing member which define a cord lock and a collar for a male receptacle.
Figure 4:
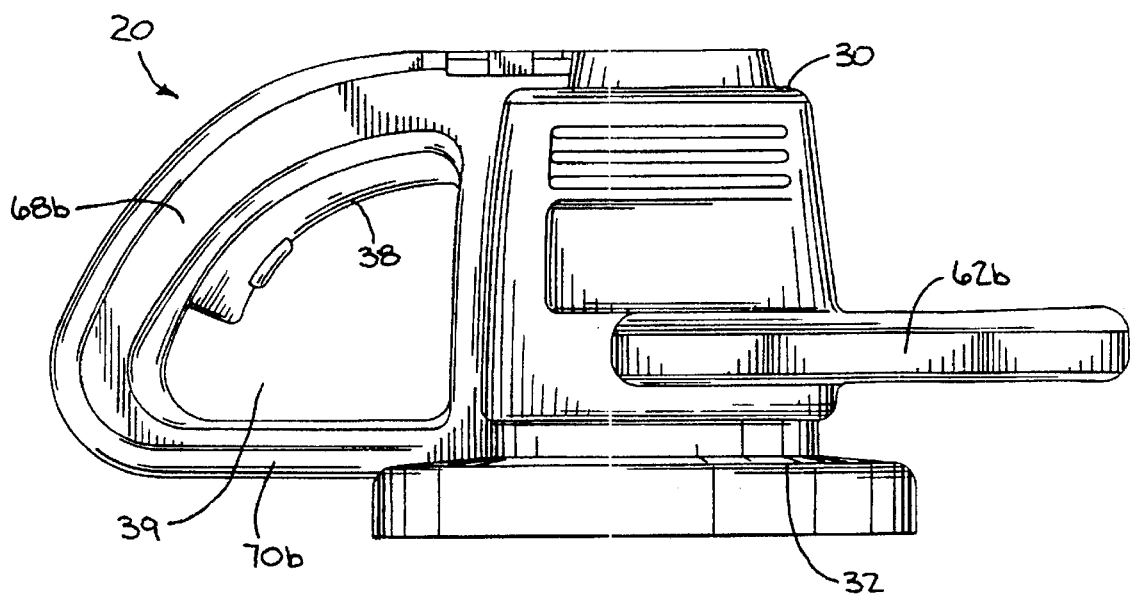
FIG. 4 is a right side elevational view of the apparatus shown in FIG. 1.
Figure 5:
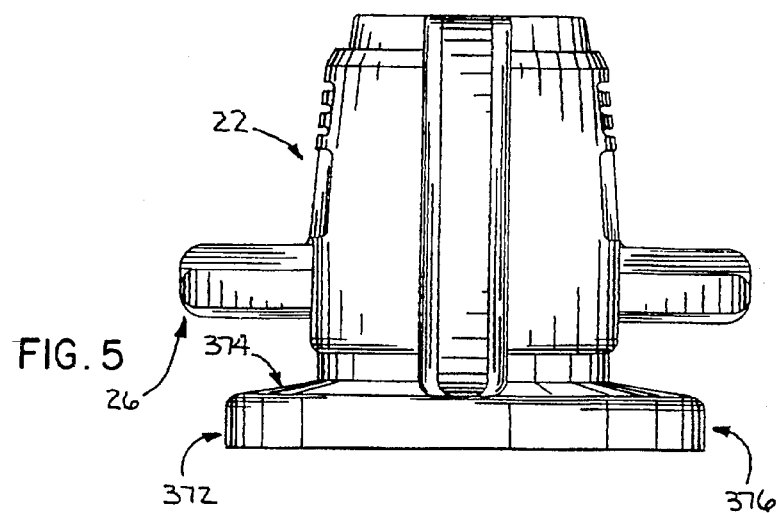
FIG. 5 is a rear elevational view of the apparatus shown in FIG. 1.
Figure 6:
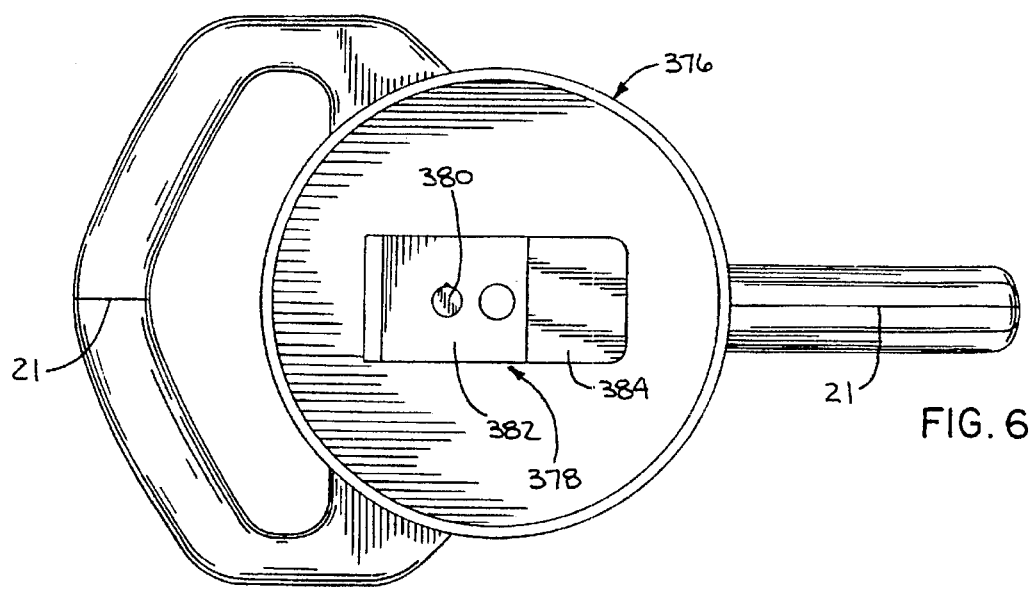
FIG. 6 is a bottom plan view of the apparatus shown in FIG. 1 showing the counterweight assembly including a quick-change post for mounting a buffer pad thereon.

FIG. 1 illustrates an ergonomic apparatus 10 for waxing, polishing, buffing or the like, according to the present invention. The inventive apparatus 10 has a symmetrical design about a vertical reference plane, not shown, extending centrally from a forward end 12 to a rearward end 14. The apparatus 10 includes a housing 16 preferably having a clamshell design with a first clamshell housing member 18 and a second clamshell housing member 20 which, when connected to each other, define a part line 21 which extends in the vertical reference plane about which the housing 16 is symmetrical, as shown in FIG. 3. Preferably, the first and second clamshell housing members 18 and 20 are molded plastic parts with their various portions described herein being formed integrally with each other. Corresponding portions on each of the symmetrical housing members 18 and 20 are identified by the same reference numeral with the portions on the first housing member 18 additionally provided with letter "a" and portions on the second housing member provided with the letter "b".

Figure 10:
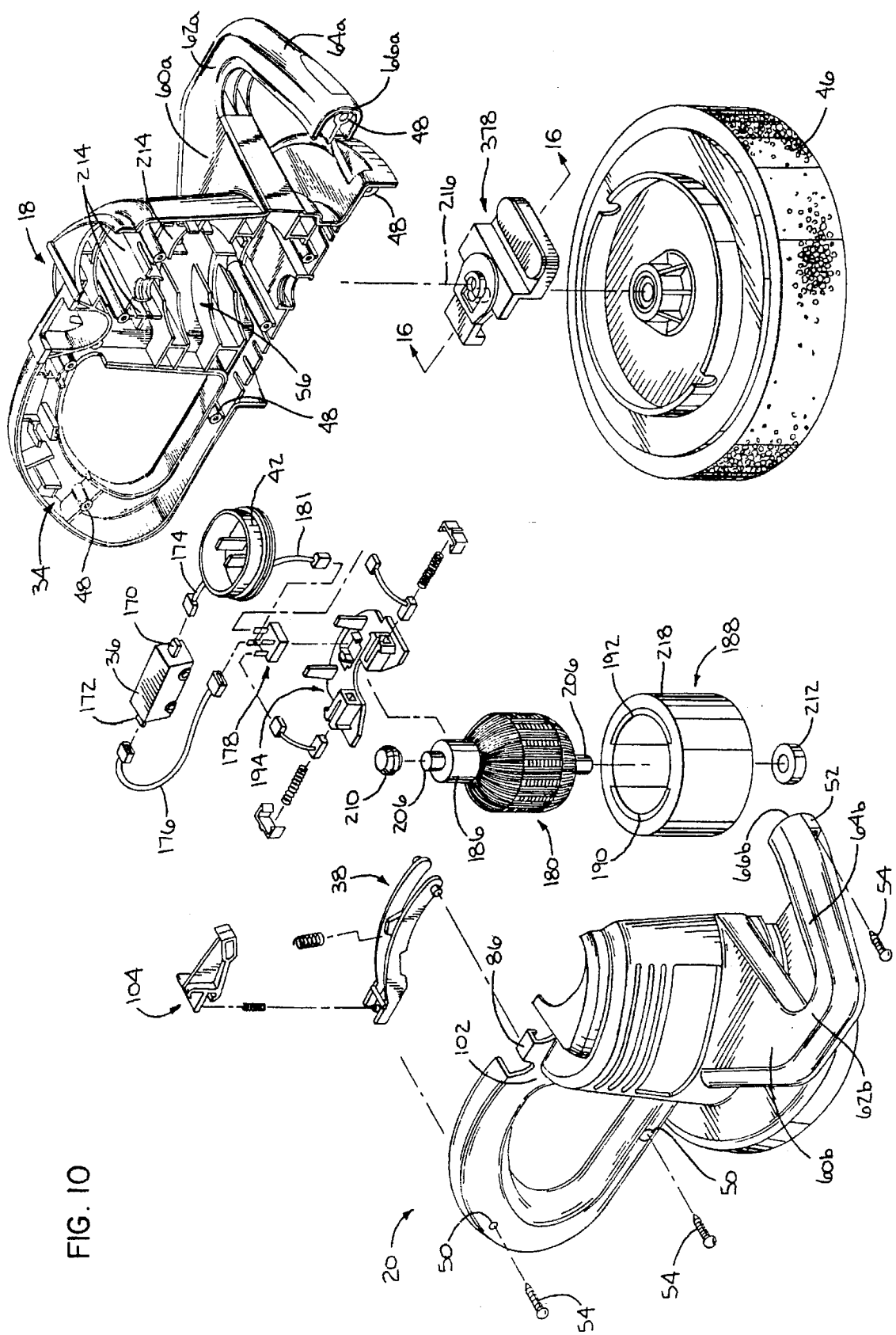
FIG. 10 is an exploded perspective view of the apparatus shown in FIG. 1 showing details of the arrangement of a DC motor having a support plate and rectifier assembly, the paddle actuator with a lock-on button, and the counterweight and pad assembly.
Figure 11:
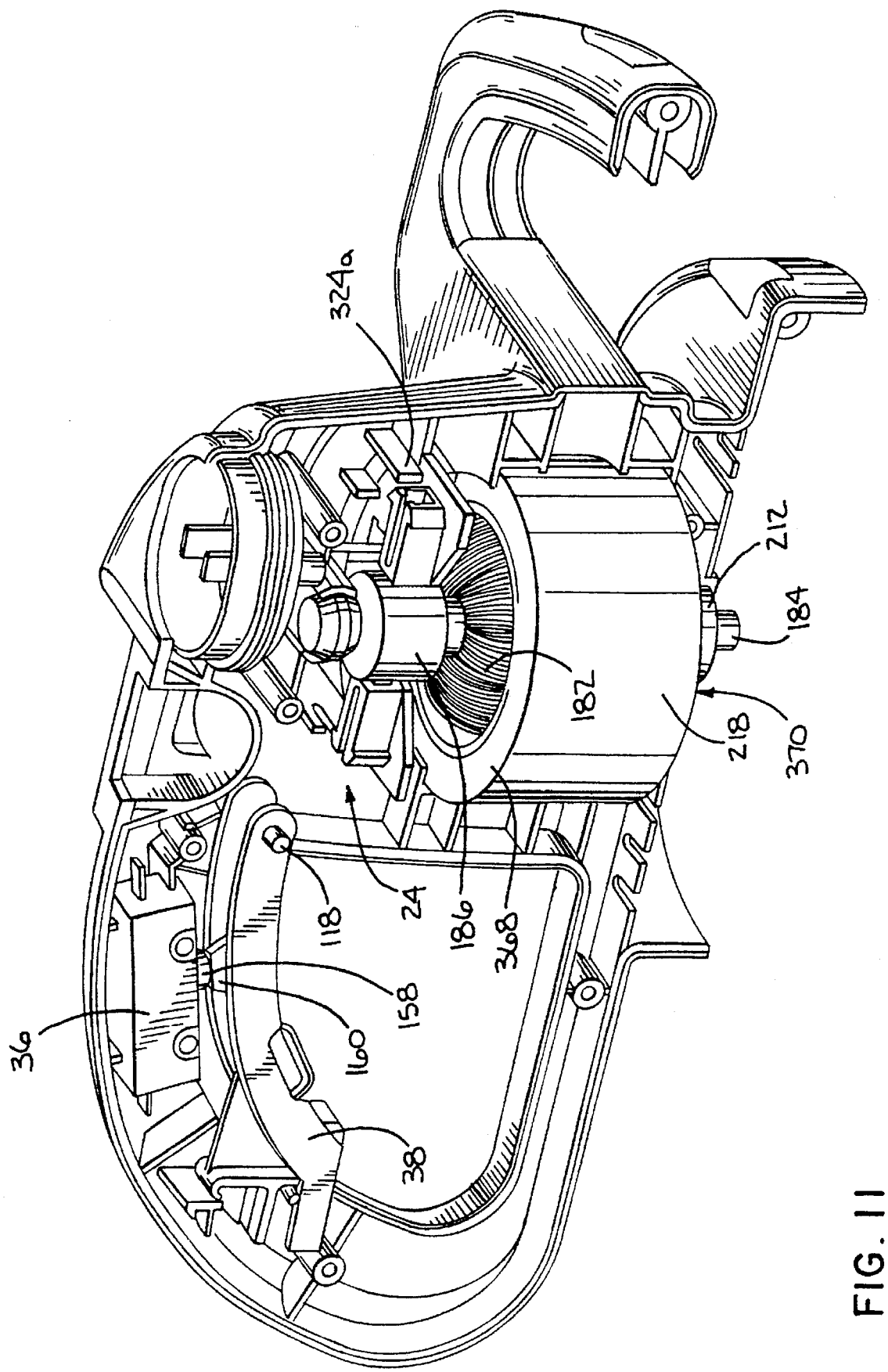
FIG. 11 is an enlarged perspective view of the motor and support plate assembly and the paddle actuator and its lock-on button mounted in the first clamshell housing member shown in FIG. 10.

The housing 16 includes a main central housing 22 in which the motor assembly 24 is mounted, as best seen in FIGS. 10 and 11. The main housing 22 includes a front handle 26 and a rear handle 28 extending therefrom. As illustrated in FIGS. 1–6, the main housing 22 includes a substantially flat top 30 and a bottom 32 and the front and rear handles 26 and 28 extend transversely to each other with the front handle 26 extending horizontally outwardly towards the forward end 12 from the main housing 22 between and substantially parallel to the top 30 and bottom 32 thereof while the rear handle 28 extends outwardly towards the rear end 14 from the main housing 22 and extends vertically and arcuately between the top 30 and bottom 32 of the main housing 22.

Figure 22:
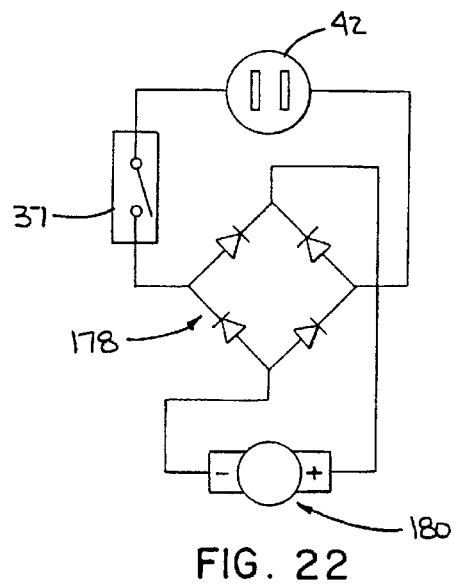
FIG. 22 is an electrical schematic diagram of the DC motor assembly according to the present invention.

The rear handle 28 has a hollow interior 34 in which a box-shaped switch housing 36, for a switching mechanism 37 illustrated schematically in FIG. 22, and an actuator paddle 38 are mounted. The actuator paddle 38 extends from the interior 34 through a bottom slot 35 formed in handle 28 to a predetermined distance outside the rear handle interior 34 in a rear gripping aperture 39 bounded by the rear handle 28. The paddle 38 has an arcuate shape substantially matching the contour of the rear handle 28 so as to be easily and readily operable when the user grips the rear handle 28 along its arcuate portion as more fully described hereafter.

Figure 7:
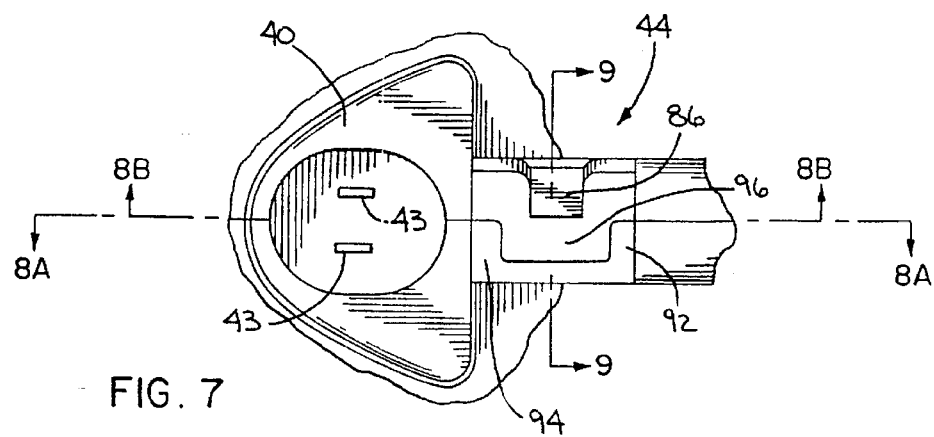
FIG. 7 is an enlarged top plan view of the cord lock and the collar and male receptacle assembly of the apparatus shown in FIG. 1, as seen in FIG. 3.
Figure 8A:
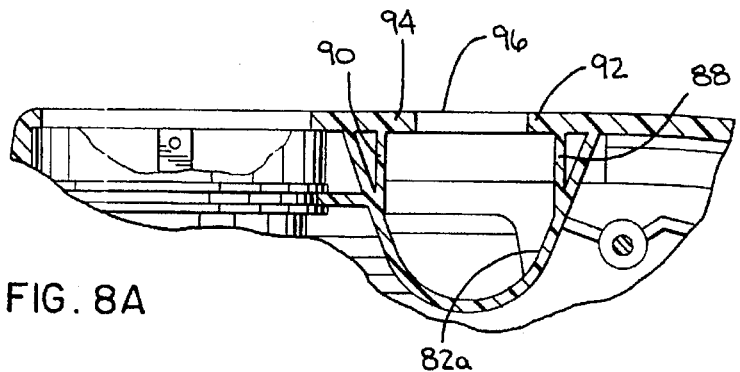
FIG. 8A is a side sectional view taken along lines 8A—8A of FIG. 7.
Figure 8B:
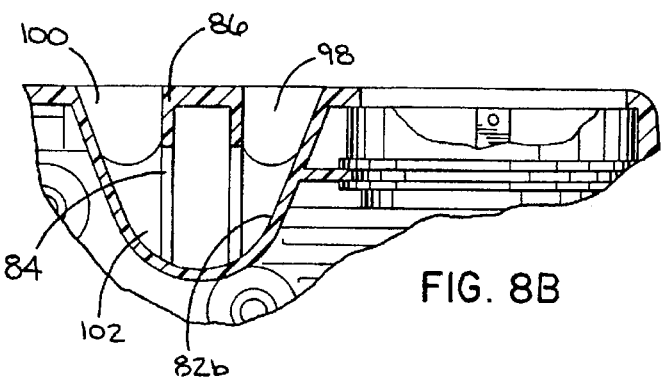
FIG. 8B is a side sectional view taken along lines 8B—8B of FIG. 7.
Figure 9:
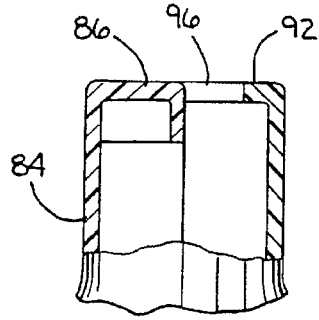
FIG. 9 is a rear sectional view taken along line 9—9 of FIG. 7.

At the top 30 of the housing 16, a raised wedge-shaped collar region 40 is defined into which a male receptacle or plug plate 42 can be mounted for receiving a female socket head of an electrical cord (not shown) for electrically connecting an alternating current power source, for 110 volts at 60 Hz, to the motor assembly 24. Adjacent the collar region 40 towards the rearward end 14 of the housing 16, a cord locking mechanism 44 is defined in the housing top 30, as shown in FIGS. 7–9. The cord locking mechanism 44 prevents accidental disconnection of the female socket head connected in the collar region 40 to the male receptacle 42. Thus, with the motor 24 activated to drive a working element, such as a buffer pad 46, and with the buffer pad 46 driven in an orbital path as will be described more fully herein, the above-described design of the housing 16 allows an operator to easily manipulate the apparatus 10 of the present invention with two hands to exert bi-planar control over the apparatus 10 while the buffer pad 46 is moved along the working surface in its orbital path without having to grab the main housing 22 to effectively and accurately guide and control the pad 46 along the working surface. Also, the placement of the electrical connection between the apparatus 10 and the electrical cord supplying AC power thereto in a recessed location on the housing top 30 and with the cord-locking mechanism 44 adjacent thereto maintains the cord in place remotely from the interface between the pad 46 and the surface being worked upon, such as a car finish, while at the same time limiting disconnections interrupting the waxing, buffing or polishing process for which the apparatus 10 can be used.

Figure 20:
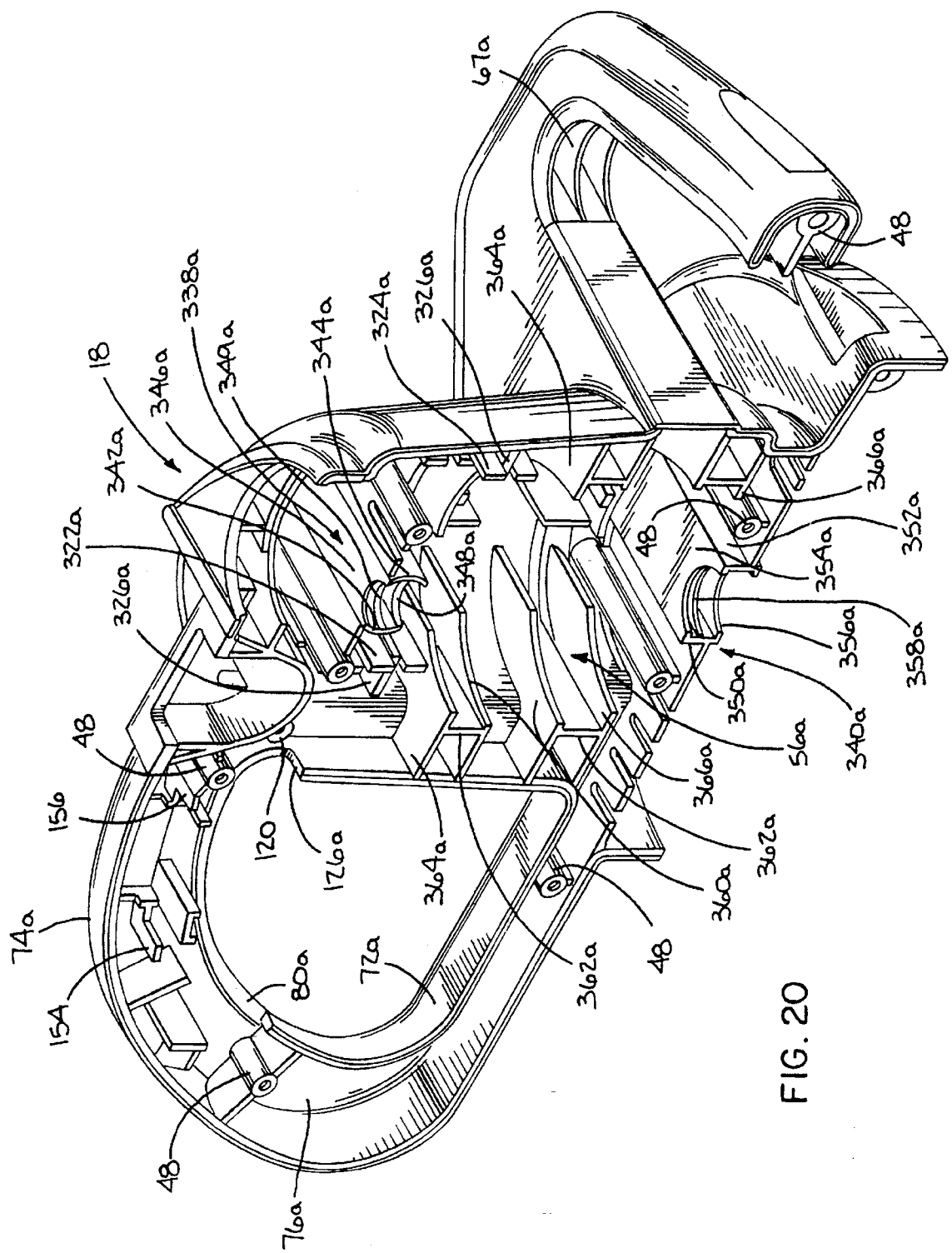
FIG. 20 is an enlarged perspective view of the first clamshell housing member.
Figure 21:
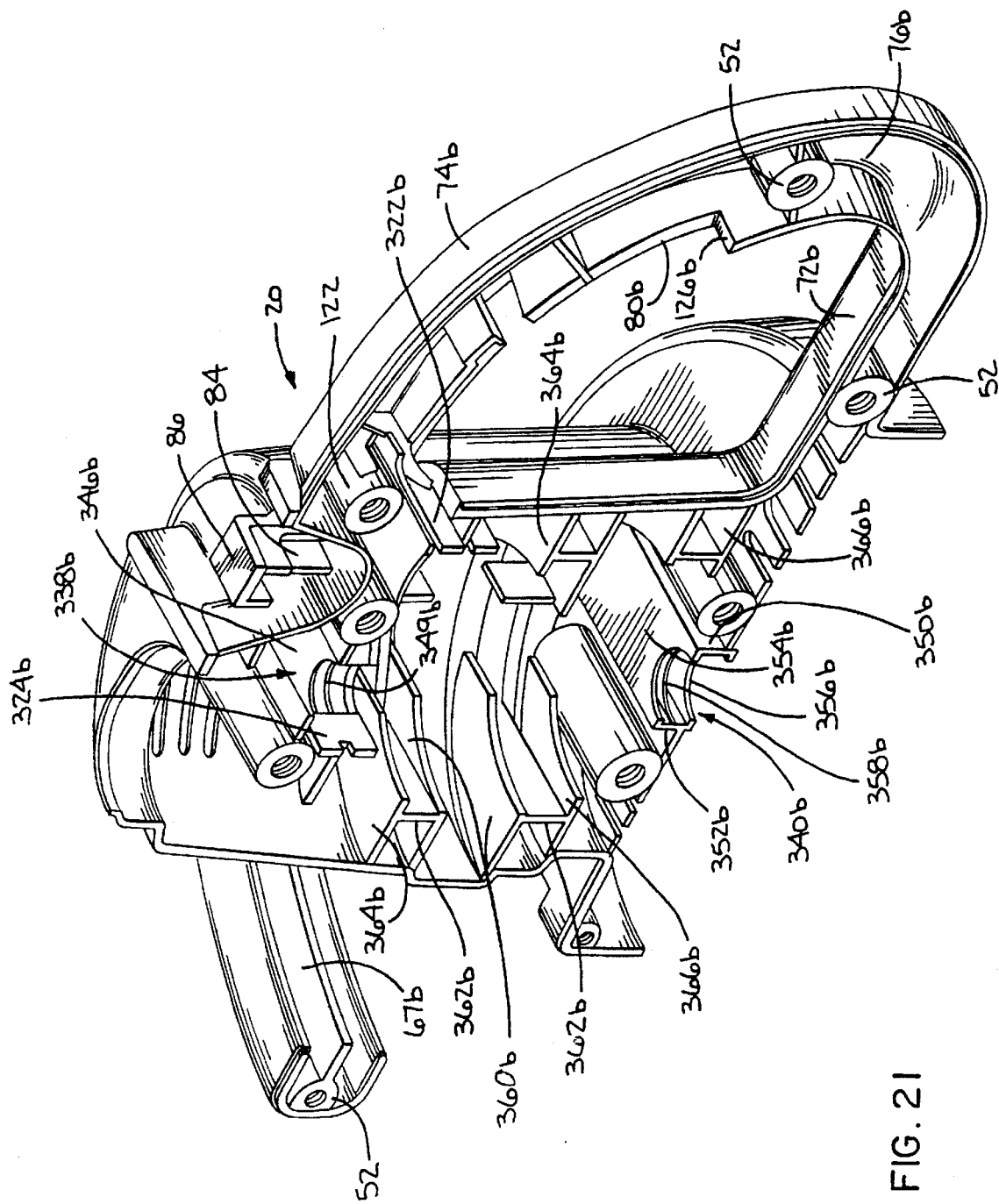
FIG. 21 is an enlarged perspective view of the second clamshell housing member.

Referring now more specifically to the configuration of the housing 16, it will be noted that the symmetrical clamshell housing members 18 and 20 cooperate to form the front and rear handles 26 and 28, the collar region 40 and the cord-locking mechanism 44 described above. More specifically and referencing FIG. 3, the clamshell housing member 18 includes main housing portion half 22a, front handle half 26a, rear handle half 28a, collar region half 40a and cord locking mechanism half 44a. Likewise, second clamshell housing member 20 includes main housing portion half 22b, front handle half 26b, rear handle half 28b, collar region half 40b and cord locking mechanism half 44b. The first clamshell housing member 18 is provided with threaded bosses 48 and the second clamshell housing member 20 has countersunk recesses 50 formed therein with each of the recesses 50 leading to a threaded boss 52, as seen in FIGS. 10, 20 and 21.

To assemble the apparatus 10, the internal components including the motor assembly 24, the switch housing 36, the actuator paddle 38 and the male receptacle 42 are mounted to the first clamshell housing member 18, as seen in FIG. 11, with the second clamshell housing member 20 then being arranged against the first clamshell housing member 18 so as to align the threaded bosses 52 of the housing member 20 with the corresponding threaded bosses 48 of the first clamshell housing member 18. With the housing members 18 and 20 so aligned, screws 54 received in threaded bosses 52 can be, in turn, received in corresponding bosses 48 to clamp the clamshell housing members 18 and 20 to each other with the heads of the screws 54 seated within the countersunk recesses 50 of the second housing member 20 so as not to protrude therefrom.

With the first and second clamshell housing members 18 and 20 attached to each other, the main housing portions 22a and 22b cooperate to define an interior space 56 in which the motor assembly 24 is mounted. As best seen in FIG. 3, the main housing portion 22 so formed has a pear-shaped cross-sectional configuration. The raised collar region 40 has a triangular shape in cross-section and, as previously mentioned, projects from the substantially flat top 30 of the housing 16. The wedge-shaped collar region 40 has an oblong central recessed area 58 into which the male receptacle 42 is placed.

Turning to the configuration of the front handle 26, each of the main housing portions 22a and 22b includes a triangular attached portion 60a and 60b, respectively, which extends horizontally outward and forward from the respective main housing portions 22a and 22b between and substantially parallel to the top 30 and the bottom 32 of the housing. From the outermost forward corner of the triangular portions 60a and 60b extend respective outer channel-shaped straight sections 62a and 62b such that with the clamshell housing members 18 and 20 attached to each other, the outer straight sections 62a and 62b extend substantially parallel to one another and the channels open towards each other. The straight sections 62a and 62b extend forwardly to angled channel-shaped gripping portions 64a and 64b, respectively, which extend at an angle from their respective straight sections 62a and 62b forwardly towards each other to distal ends 66a and 66b which abut one another along the part line 21 and define a bent section of the front handle 26 where the channels open rearwardly towards the main housing 22 with the clamshell housing members 18 and 20 attached.

Intermediate horizontal supporting members 67a and 67b extend within the channels of the respective straight sections 62a and 62b and angled gripping portions 64a and 64b, as best seen in FIGS. 20 and 21. Corresponding bosses 48 and 52 are formed on the intermediate supporting members 67a and 67b at the distal ends 66a and 66b and can be aligned with each other when the housing members 18 and 20 are brought together such that one of the screws 54 received in the aligned front handle threaded bosses will provide an attachment between the housing members 18 and 20 at the front handle distal ends 66a and 66b. In this manner, the front handle 26 is formed defining a forward gripping aperture 69 by the above-described connection between the angled portions 64a and 64b.

The clamshell housing members 18 and 20 also include rear handle arcuate gripping portions 68a and 68b which extend integrally from near the rear end of the top 30 of the main housing 22 and, more specifically, from the rear of the cord locking mechanism 44. The arcuate gripping portions 68a and 68b continue rearward and vertically downward to a point aligned with the bottom 32 of the main housing portion 22 so as to extend substantially through a quarter-circle arc. At this point, the rear handle 28 includes straight joining sections 70a and 70b, respectively, which extend from their respective arcuate gripping portions 68a and 68b back to the main housing portions 22a and 22b at the bottom 32 thereof. To join the rear handle portions 28a and 28b, one of the threaded bosses 48 is formed in the arcuate gripping portions 68a and one is formed in the straight joining section 70a along with corresponding threaded bosses 52 in the arcuate gripping portion 68b and straight joining section 70b such that with screws 54 received in the rear handle aligned bosses 48 and 52, the rear handle portions 28a and 28b are secured to each other to form the rear handle 28 and define the rearward gripping aperture 39.

As shown in FIGS. 20 and 21, the rear handle portions 28a and 28b are formed as channel-like members having opposing sidewalls with each including a smaller inner sidewall 72a and 72b and a larger outer sidewall 74a and 74b and a connecting web wall 76a and 76b spanning their respective inner and outer sidewalls 72 and 74 such that when the rear handle portions 28a and 28b are connected, they define a hollow rear handle 28 with the rear handle interior space 34 in which the switch housing 36 is mounted. Further, the inner sidewalls 72a and 72b each include respective cut-out sections 80a and 80b along the arcuate gripping portions 68a and 68b such that, with the rear handle portions 28a and 28b connected, the cut-out sections 80a and 80b cooperate to define the bottom slot 35 for the actuator paddle 38. With the actuator paddle 38 mounted in the rear handle interior space 34, the actuator paddle 38 includes a portion which extends through the bottom slot 35 into the rearward gripping aperture 39 spring biased to a predetermined distance beyond the inner sidewall 72.

The configuration of the cord locking mechanism 44 adjacent the collar region 40 will next be described with reference to FIGS. 7–9, 20 and 21. As previously mentioned, the cord locking mechanism 44 is disposed rearwardly of the raised wedge-shaped collar region 40 and includes a trough or well surface 82 defined by recessed U-shaped surfaces 82a and 82b in the respective main housing top portions 30a and 30b, as best seen in FIGS. 8A and 8B. An upstanding flange 84 extends from the bottom of the trough portion 82b to the top of the projecting wedge collar region 40 with a tab 86 formed threat at right angles to the flange 84 and projecting over the trough 82 so that the top of the tab 86 is flush with the top of the wedge collar 40. Trough portion 82a has upstanding parallel side flanges 88 and 90 spaced from each other along either side of the trough portion 82a and having respective overhung lip portions 92 and 94 which project towards each other over the trough portion 82a.

Thus, when the housing members 18 and 20 are aligned and clamped together, the cord locking mechanism 44 is formed. With the female socket head on an electrical cord attached in the collar region 40 to the prongs 43 of the plug plate 42, the portion of the cord adjacent the female head can be inserted through the zig-zag entry slot 96 defined between the overhung lip portions 92 and 94 and the tab 86. The section of the cord adjacent the female head inserted through the entry slot 96 can be positioned so that it is clamped between the trough surface 82 and the overhung tab 86 positioned thereabove with the ends of the cord section extending around the upstanding flange 84 and through access openings 98 and 100 formed in the sidewall portion 102 of the trough surface 82b on either side of the flange 84. In practice, when the apparatus 10 is being used and the slack in the cord is taken up, as when the apparatus 10 is moved further away from the electrical outlet, tension created by tightening of the slack in the cords will be substantially taken up by the frictional engagement of the cord between the well surface 82 and the overhung tab 86 and lip portions 92 and 94 such that the interface of the female head with the male prongs 43 will experience little or no tension during normal usage of the appliance, thereby significantly reducing the potential occurrences of accidental disconnection at the interface.

Figure 12:
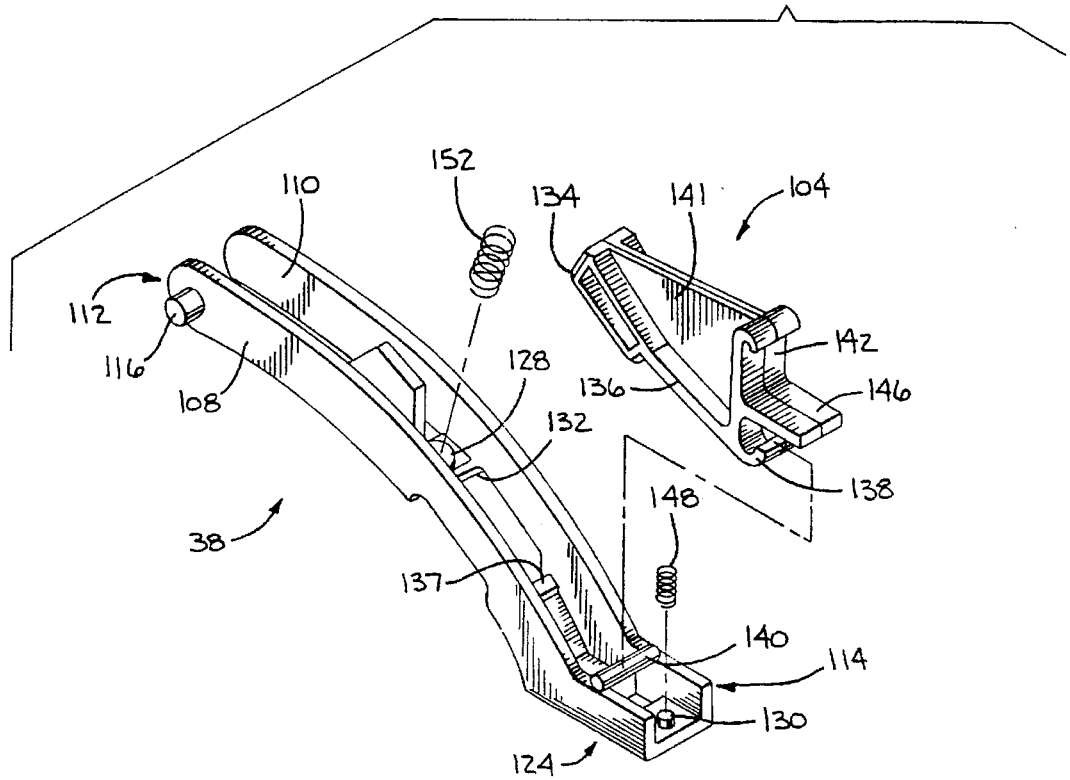
FIG. 12 is an exploded perspective view of the paddle actuator and lock-on button assembly shown in FIG. 16.
Figure 13:
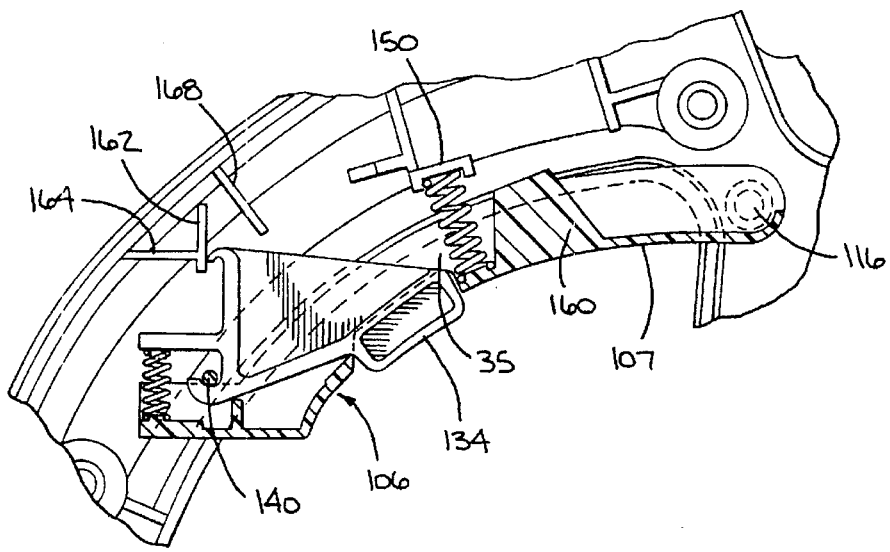
FIG. 13 is a side elevational view, partially in section, of the assembled paddle actuator and lock-on button assembly shown in FIG. 10.

Turning to FIGS. 12 and 13, the construction and operation of the actuator paddle 38 including a lock-on mechanism 104 which is mounted in nested relation therewith is illustrated. The actuator paddle 38 has an arcuate elongate channel-shape with a bottom surface 106 having an arcuate portion 107 provided with a radius of curvature substantially the same as the rear handle arcuate gripping portion 68 and being adapted to be gripped by an operator. Two upstanding parallel sidewalls 108 and 110 extend along either side of the bottom wall 106 such that the channel of the elongate arcuate-shaped actuator paddle 38 opens towards the rear handle interior space The elongate actuator paddle 38 has a forward end 112 and a rearward end 114 and includes a pair of trunnion pivots 116 and 118 extending laterally each from one of the sidewalls 108 and 110 at the forward end 112 of the paddle 38. The paddle 38 is mounted in the rear handle interior space 34 by a pair of corresponding trunnion mounts 120 and 122 in respective housing members 18 and 20. The trunnion mounts 120 and 122 are disposed adjacent the well 82 rearwardly thereof such that with the housing members 18 and 20 connected, the actuator paddle 38 will extend from the base of the well 82 along the curve of the arcuate rear handle gripping portion 68 to the rear end of the cut-out 80 therein. At the rearward end 114 of the paddle 38, a support 124 for the lock-on mechanism 104 is formed. With the trunnions 116 and 118 mounted in their respective trunnion mounts 120 and 122, the support 124 extends substantially horizontally and is normally biased into engagement with a transverse portion 126 of the inner sidewall 172 at the rear of the cut-out 80. A pair of spring pedestals 128 and 130 are formed on the bottom wall 106 with the forward pedestal 128 located on the arcuate portion 107 of the bottom wall 106 and the rear pedestal 130 located on the horizontal support portion 124 of the bottom wall 106.

The paddle 38 is further provided with an aperture 132 formed along its arcuate portion 107 in the bottom wall 106 and sidewalls 108 and 110 for receipt of the lock-on mechanism 104 therethrough. More specifically, the lock-on mechanism 104 includes a button 134 and a substantially flat base member 136 extending rearwardly therefrom. With the lock-on mechanism 104 assembled in nested relation to the actuator paddle 38 and the button 134 projecting through the paddle aperture 132, the base 136 extends from a support portion 137 formed on the backside of the arcuate portion 107 adjacent the rear of the button aperture 132 in the channel of the actuator paddle 38 and into the channel of the support portion 124 where the base 136 has a curved end 138 which is adapted to engage a pivot rod 140 fixed to the paddle 38 extending across the sidewalls 108 and 110 in the support portion 124. Partition wall 141 extends along the back of the button 134 and the flat portion of the base 136 and upwardly beyond the channel formed by the paddle 38 where it ends at a transverse wall 142 upstanding from the base 136 with the transverse wall 142 similarly extending upwardly beyond the channel of the paddle 38. At the top of the transverse wall 132, a curved cam surface 144 is formed for locking the paddle 138 in a closed position, as will be more fully described hereafter.

Above the curved end 138 and below the curved cam surface 144, an intermediate spring engaging member 146 extends rearwardly from the transverse wall 142. A small spring 148 is mounted in compression between the intermediate spring engaging member 146 and the bottom wall 106 in the support 124 encircling the spring pedestal 130. In this manner the lock-on mechanism 104 is normally biased about pivot rod 140 so that the button member 134 extends through the paddle aperture 132. The rear handle portion 28a includes a spring-engaging flange 150 formed in the rear handle interior space 34 disposed along the cut-out 80 of the rear handle 28. A large spring 152 is mounted in compression between the spring-engaging flange 150 and the base 136 and encircling the spring pedestal 128 to normally bias the actuator paddle 38 to an open position where the paddle 38 projects from the slot 80 in the rear handle inner sidewall 82 into the rear gripping aperture 39.

The rear handle portion 28 has switch supporting bracket ribs 154 and 156 formed in the rear handle interior space 34 along the cut-out slot 80 with the ribs 154 and 156 framing and supporting either side of the box switch housing 36. The switch housing 36 includes an activation plunger 158 (see FIG. 11) extending therefrom and the actuator paddle 38 includes an upstanding trapezoidal flange or actuating member 160 forwardly of the aperture 132 and the pedestal 128 adapted to engage the activation plunger 158 when the paddle 38 is depressed.

In practice, an operator can readily use one hand wrapped about the rear handle 28 to properly orient the buffer pad 46 over the surface on which work, e.g., buffing, polishing or the like, is to be performed. As the rear handle 28 extends back from the main housing 22, below which is mounted the pad 46, the operator can use the rear handle 28 to reach a large region of a work surface from a relatively stationary position. Once the pad 46 is properly oriented above the work surface, the actuator paddle 38 can be depressed against the spring bias to a closed position with the paddle 38 pivoting about its forward trunnions 116 and 118 and carrying the lock-on mechanism 104 therewith as by engagement of the support portion 137 with the base 136 of the lock-on mechanism 104. With the paddle 38 so depressed, the flange 160 engages and likewise depresses the activation plunger 158 closing the switch circuit (see FIG. 22) to activate the motor assembly 24 and drive the pad 46 in its orbital path.

By providing an elongate, arcuate paddle 38 which follows the contour of the arcuate rear handle gripping portion 68 an operator can grab the rear handle 28 at various positions along the gripping portion 68, while still being able to depress the paddle 38 to its operative position without requiring an independent operation with their other hand and/or before the operator is ready to support and maneuver the apparatus 10 by the rear handle 28 during operation thereof. To deactivate the motor assembly 24, and therefore the apparatus 10, an operator need merely release the actuator paddle 38 which, by virtue of being spring loaded to its extended open position, will deactivate the motor assembly 24 by disengagement of the flange 160 from the activation plunger 158 to open the switch circuit.

In addition, if an operator does not wish to continually depress the paddle 38 during operation of the apparatus 10, the lock-on mechanism 104 can be readily accessed and utilized in an easy manner without interrupting operation of the apparatus 10 and/or requiring use of the operator's other hand. As previously mentioned, the lock-on mechanism 104 includes the transverse wall 142 extending into the rear handle interior space 34. In the interior space 34, a locking flange 162 is connected to the outer sidewall 74a disposed over the inner sidewall transverse portion 126 and includes a horizontal portion 164 and a connected vertical portion 166. Cooperating with the lock flange 162 is a guide flange 168 connected to the outer sidewall 74a and spaced forwardly from the vertical portion 166.

The paddle 38 and lock-on mechanism 104 are arranged so that with the paddle 38 depressed to its operative position, the cam end 144 will be positioned near the top of the vertical portion 166 between it and the guide flange 168. To continuously use the apparatus 10 without having to correspondingly continuously depress the paddle 38 to its operative position, the button member 134 can be depressed towards the rear handle interior space 34, i.e., in the same direction in which the actuator paddle 38 is being depressed, against the bias of spring 148, causing the outside of the curved cam surface 144 to cammingly engage the guide flange 168 and be directed over the top of the vertical portion 166 of the lock flange 162 and latch onto the lock flange vertical portion 166 under the influence of large spring 152 with the actuator 38 being maintained in its closed operative position by the lifting force applied by the curved end 138 on the pivot rod 140. To effect release of the actuator paddle 38 from the locked position, the operator merely depresses the paddle 38 slightly further to reduce the influence of large spring 152 sufficiently so as to allow the spring 148 to urge the curved cam end 144 over the top of the lock flange vertical portion 166 and against the guide flange 168 as by the pivoting action of the curved end 138 about the pivot rod 140. Thereafter, the paddle 38 is released with the spring 150 biasing the paddle 38 to the open position to deactivate the motor assembly 24.

To provide electrical power from the plug plate 42 to the motor assembly 24, the switching mechanism 37 includes an input terminal 170 and an output terminal 172 extending through sides of the switch housing 36. As best seen in FIG. 10, a lead 174 is electrically connected to the plug plate 42 and extends to the switching mechanism input terminal 170 while another lead 176 extends from the output terminal 172 to a fullwave rectifier 178 for the DC motor assembly 24. A lead 181 is electrically connected to the plug plate 42 and extends directly to the rectifier 178. As is conventional, the rectifier 178 converts AC power received at the plug plate 42 to DC power for application to the DC motor assembly 24. Thus, with the switching circuit closed as caused by depressing the paddle 38 to its operative position, DC electrical power will be provided to the armature coils, as more fully discussed herein.

The various motor assembly components are supported and oriented directly by the clamshell housing members 18 and 20 which, when connected, cooperate to clamp the motor in place in the main housing 22 without employing an extended yoke as a container to support and position the various motor components and/or a separate base or frame member to support the yoke in the housing. Referring to FIGS. 10 and 11, the motor assembly 24 consists of an armature 180 which can be of standard construction, including a core and windings 182 aligned around a shaft 184 on which is also mounted the commutator 186. A steel stator yoke 188 of open cylindrical shape is provided and can have a pair of large semi-circular permanent magnets 190 and 192 pressed therein with the magnets 190 and 192 having a half-inch gap between each other in the yoke 188 at their ends.

Figure 14:
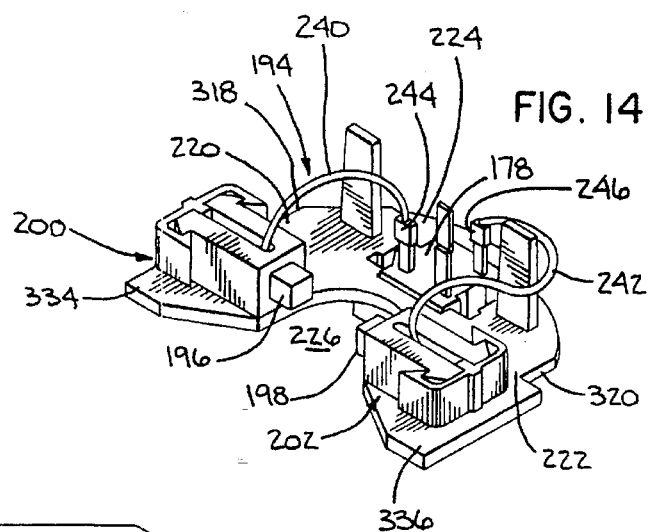
FIG. 14 is a perspective view of the assembled support plate and rectifier assembly shown in FIG. 10.
Figure 15:
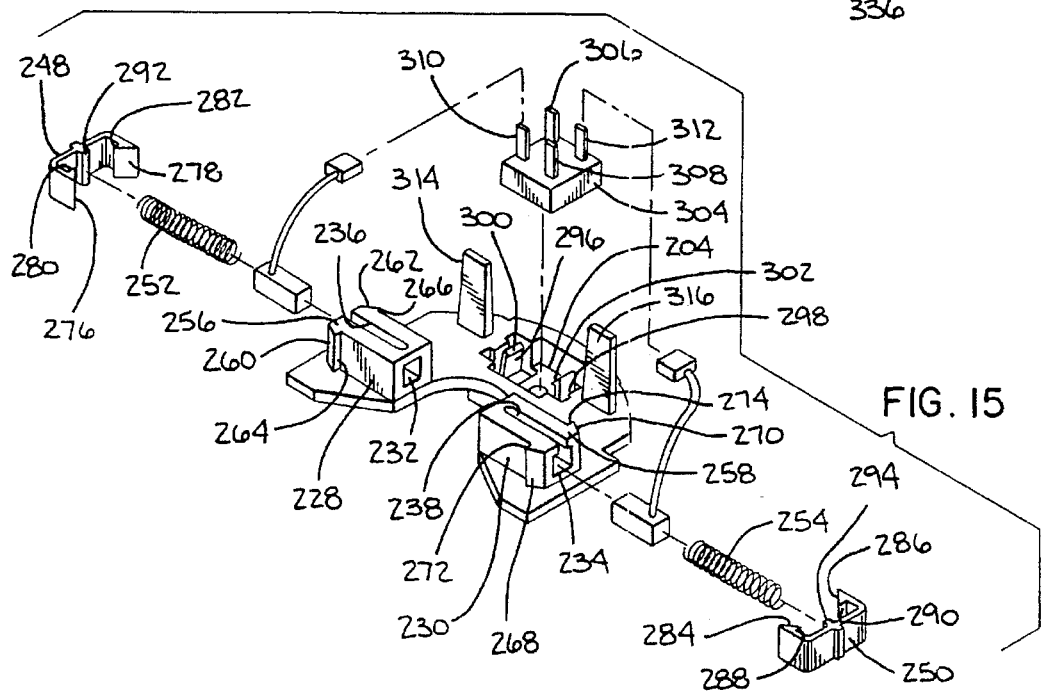
FIG. 15 is an exploded view of the support plate and rectifier assembly shown in FIG. 14.
Figure 16:
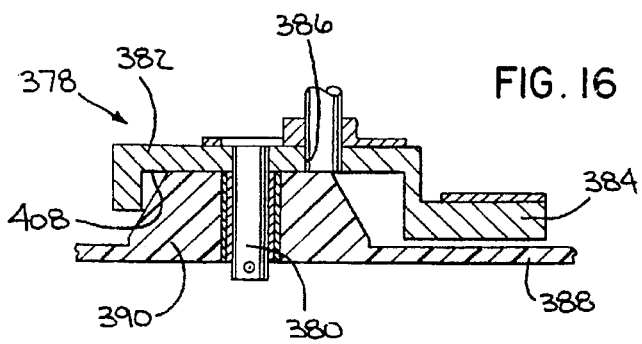
FIG. 16 is a side sectional view of the counter-weight and buffer pad assembly showing a mounting plate of the pad and a mounting post and detent ball inserted through an axial lining of the buffer pad mounting plate.
Figure 17:
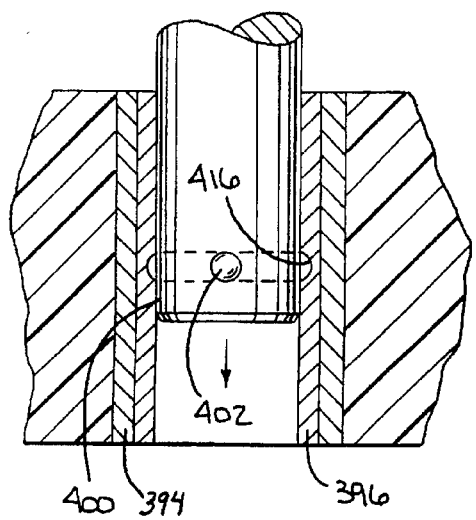
FIG. 17 is an enlarged sectional view of the support post and the axial lining shown in FIG. 16 showing a circumferential groove in the axial lining with the detent ball in the groove.
Figure 18:
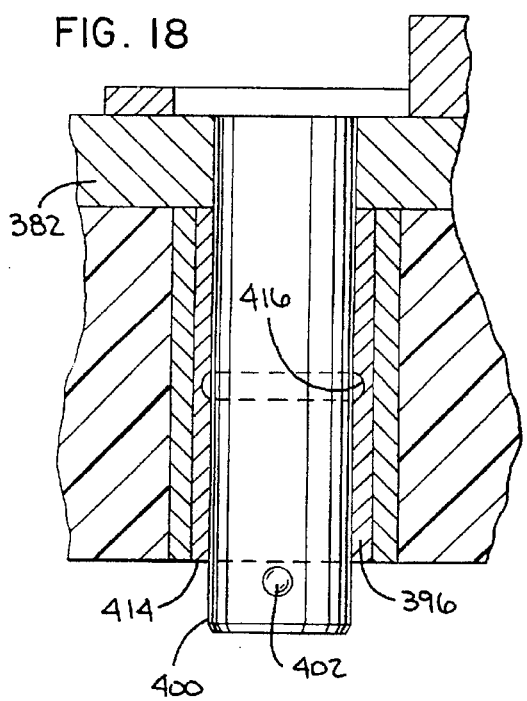
FIG. 18 is an enlarged sectional view of a portion of the apparatus shown in FIG. 17, showing the post inserted through the axial lining with the detent ball abutting the bottom of the lining to removably secure the pad to the post.
Figure 19:
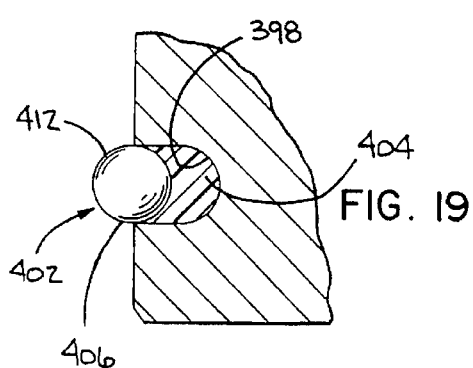
FIG. 19 is a side sectional view of the post showing the detent ball attached to a plastic backing which is attached in a recess of the post.

A support plate 194 mounts the brushes 196 and 198 in respective brush housings 200 and 202 thereon and the rectifier 178 in a rectifier well 204 formed therein, as illustrated in FIGS. 14 and 15. Referring to FIGS. 10 and 11, the armature shaft 184 includes top and bottom ends 206 and 208 with a spherical bushing 210 being mounted about the top end 206 of the shaft 184 and a ring ball bearing 212 being mounted about the shaft 184 near its bottom end 208.

The first and second housing members 18 and 20 each include a plurality of alignment and support members generally designated 214 which are symmetrically arranged about a longitudinal axis 216 extending centrally through the main housing 22. The alignment and support members 214 clampingly engage the outer surface 218 of the yoke 188 and tightly capture the top and bottom bearings 210 and 212 when the housing members 18 and 20 are secured to each other so that the yoke 188 and the armature 180 are in alignment along the longitudinal axis 216 with the armature shaft 184 extending therealong and the cylindrical yoke 188 encircling the armature 180. In this manner, the motor assembly 24 and the housing 16 are assembled together in one manufacturing operation without requiring a separate assembly operation for the motor before it is mounted in the housing. In addition, the motor circuitry including the switch housing 36, the plug plate 42 and the support plate 194, including the brushes 196 and 198 and the rectifier 178 can be assembled as a sub-assembly before the they are mounted to the housing 16.

More specifically and referring to FIGS. 14 and 15, the support plate 194 preferably has a U-shape having opposed leg portions 220 and 222 and a transverse foot portion 224 which extends between and cooperates with the leg portions 220 and 222 to define a central commutator space 226. The support plate 194 is mounted in the housing 16 such that the leg portions 220 and 222 are spaced on either side of the commutator 186 with the commutator 186 positioned in the central space 226. The brush housing 200 is mounted on leg portion 220 and the brush housing 202 is mounted on leg portion 222 spaced 180° from each other around the commutator 186. The brush housings 200 and 202 each include a main body 228 and 230, respectively, having respective brush-receiving bores 232 and 234 extending therethrough. Central guide slots 236 and 238 are formed in the top of the main bodies 228 and 230, respectively, with the guide slots 236 and 238 communicating with respective bores 232 and 234. The brushes 196 and 198 are received in their respective brush-receiving bores 232 and 234 and include attached leads 240 and 242, respectively, each having respective flag terminals 244 and 246 for electrically connecting the brushes 196 and 198 to the rectifier 178.

With the brushes 196 and 198 placed in their bores 232 and 234, and the support plate 194 mounted in the housing 16 about the commutator 186, the brushes 196 and 198 are biased so that at least a portion thereof extend into the central space 226 into contact with the outer surface 218 of the commutator 186. In this manner, the brushes 196 and 198 slidingly ride along the commutator outer surface 218 as it rotates on the armature shaft 184 to thereby electrically connect the power source to the armature coils. To urge the brushes 196 and 198 into contact with the commutator 186, each of the housings 200 and 202 include respective caps 248 and 250 and springs 252 and 254. The main body 228 and the main body 230 include enlarged outer ends 256 and 258, respectively. The enlarged outer end 256 includes oppositely-facing ramp surfaces 260 and 262 extending inwardly to respective straight shoulder surfaces 264 and 266. Likewise, enlarged end 258 includes oppositely-facing ramp surfaces 268 and 270 extending inwardly to respective straight shoulder surfaces 272 and 274.

For capturing and locking the cap 248 on the main body 228, the cap 248 includes a pair of ramp surfaces 276 and 278 extending from either side thereof to respective inner shoulder surfaces 280 and 282. Likewise, cap 250 is provided with ramp surfaces 284 and 286 extending from either side thereof to respective shoulder surfaces 288 and 290. The inner rear surfaces of each of the caps 248 and 250 is provided with a slightly raised spring locating boss 292 and 294, respectively.

To assemble the brushes 196 and 198 in their respective housings 200 and 202, the brushes 196 and 198 are inserted into their respective bores 232 and 234 with their lead wires 240 and 242 extending from the bores 232 and 234 through the slots 236 and 238 thereof with the flag terminals 244 and 246 then being connected to appropriate output terminals on the rectifier 178, as will be described herein. To urge the brush 196 through the bore 232 of the housing 228 and into the central space 226, the spring 252 is placed in the bore 232 with one end in contact with the brush 196 and its other end located on the boss 292 with the cap 248 then being press fit onto the enlarged end 256 of the main body 228 of the housing 200. The cap 248 is press fit onto the main body 228 by moving the ramp surfaces 276 and 278 against and along the ramp surfaces 260 and 262 so as to urge the cap sides outwardly as the cap 248 is pushed onto the main body 228. Once the ramp surfaces are pushed past each other, the sides of the cap 248 will rebound to their original, straight configuration with the cap shoulder surfaces 280 and 282 confronting respective shoulder surfaces 264 and 266 on the main body so as to lock the cap 248 thereon. With the cap 248 locked in place, the spring 252 will act to bias the brush 196 so that it extends out from the central bore 232 into the central space 226, limited by the engagement of the lead 240 with the inner end of the guide slot 236, as best seen in FIG. 13. The cap 250 is similarly press-fit and locked onto the main body 230 so as to bias the brush 198 through the bore 234 into the central space 226.

In the foot portion 224 of the support plate 194, the recessed rectifier well 204 is formed. The rectifier well 204 includes a pair of resilient upstanding locking members 296 and 298 therein, with the locking members 296 and 298 each having an enlarged locking portion 300 and 302 at their respective upper ends. The rectifier 178 includes a body portion 304 with a pair of input terminals 306 and 308 and a pair of output terminals 310 and 312 extending from the body portion 304. The rectifier 178 is assembled in the rectifier well 204 by pushing the rectifier body portion 304 against the enlarged ends 300 and 302 of the resilient locking members 296 and 298. This causes the locking members 296 and 298 to be urged outwardly thereby allowing the rectifier body portion 304 to be pushed past the enlarged ends 300 and 302 to seat in the well 204 with the resilient locking members 296 and 298 then snapping back to a locking position with the enlarged ends 300 and 302 abutting against the upper face of the body portion 304 to tightly capture the rectifier 178 in the recessed well 204.

A pair of lead guiding stakes 314 and 316 extend from the support plate 194 substantially at the junctures of the support plate foot portion 224 with the leg portions 220 and 222. The sub-assembly of the plug plate 42, the switch housing 36, and the rectifier 178 and brushes 196 and 198 on the support plate 194 includes lead electrical connections as described below. As one skilled in the art will appreciate, various arrangements of lead wires can be utilized with the motor assembly 24 to transmit electrical power thereto. Preferably, the lead 174 is electrically connected at one end to the plug plate 42 and at its other end it has a flag terminal 174a which is electrically connected to the input terminal 170 of the switching mechanism 37. The lead 176 has a flag terminal 176a attached to the output terminal 172 of the switching mechanism 27 with its other flag terminal 176b at the other end of the lead 17 attached to one of the input terminals 306 and 308 of the rectifier 178. The lead 181 is electrically connected at one end to the plug plate 42 and at its other end it has a flag terminal 181a which is attached to the other one of the rectifier input terminals 306 and 308. The brush leads 240 and 242 are each electrically connected to one of the output terminals 310 and 312 preferably with flag terminal 244 connected to output terminal 310 and flag terminal 246 connected to output terminal 312, as seen in FIG. 14. To ensure that the non-insulated braided lead wire 242 is isolated from the other similarly non-insulated braided wires, the lead wire 242 extends from the guide slot 238 around the lead guiding stake 316 and to the output terminal 312. As is apparent, the lead guiding stakes 314 and 316 can be used to guide the lead wires connecting to the rectifier terminals in various arrangements so as to prevent the non-insulated lead wires from contacting each other.

For mounting of the rectifier and brush support plate 194 in the housing interior space 56, cut-outs defining shoulders 318 and 320 are formed along the outer edges of the support plate leg portions 220 and 222, respectively. Referring to FIGS. 11 and 20, the alignment and support members 214 of the housing member 18 include a pair of notched vertical ribs 322a and 324a with each of the vertical ribs including a horizontal abutment member 326a and 328a extending laterally from the notched area to the housing member 18. The vertical ribs 322a and 324a are laterally spaced from each other in the housing internal space portion 56a with the spacing corresponding to the distance between the support plate shoulders 318 and 320 so as to snugly receive the support plate shoulders 318 and 320 in the vertical rib notches against the abutments 326a and 328a when the plate 194 is mounted to the housing member 18. With the support plate 194 so mounted, the longitudinal axis 216 extends through the support plate central space 226.

To clamp the support plate 194 in the housing interior space 56, corresponding notched vertical ribs 322b and 324b are formed in housing member 20 (see FIG. 21) with their notches being vertically aligned with the notches in the vertical ribs 322a and 324a when the housing members 18 and 20 are connected. The notched vertical ribs 322b and 324b engage the ends 334 and 336 of the support plate leg portions 220 and 222 projecting beyond the respective brush housing 228 and 230 so as to clamp the support plate 194 against movement in the housing interior space 56.

To mount the armature 180 in the housing interior space 56 with the armature shaft 184 aligned along the longitudinal axis 216, the alignment and support members 214 include upper and lower bearing engaging members 338a and 340a in housing member 18 and corresponding upper and lower bearing engaging members 338b and 340b in housing member 20 which cooperate to form top and bottom pockets in the housing interior space 56 with the longitudinal axis 216 extending through these pockets. The pockets formed by the bearing engaging members 338 and 340 are configured so as to securely capture the respective top and bottom bearings 210 and 212 against movement in the housing interior space 56.

More specifically, since the top bearing 210 is preferably a spherical bearing, the top bearing engaging member 338 is formed with a pair of curved sidewalls 342 and 344 with the radius of curvature of the sidewalls 342 and 344 substantially matching that of the spherical bearing 210. In this manner, the spherical bearing 210 is prevented from moving axially along the longitudinal axis 216 when captured by the upper bearing engaging member 338 in the housing interior space 56. In addition, the curved sidewalls 342 and 344 are connected by horizontal top and bottom members 346 and 348 with the top and bottom members 346 and 348 being curved at their ends adjacent the longitudinal axis 216. Extending between the curved sidewalls 342 and 344 intermediate the top and bottom members 346 and 348 is a horizontal support rib 349 having a curved end which does not extend as far towards the axis 216 as the ends of the top and bottom members 346 and 348 to accommodate and match the shape of the spherical bearing 210. Thus, the diameter across the curved ends of the intermediate support ribs 349a and 349b in each of the housing members 18 and 20 when attached is substantially the same as the largest diameter extending across the middle of the spherical bearing 210. Similarly, the diameter across the curved ends of the horizontal top and bottom members 346 and 348 substantially matches the smaller diameter across the top and bottom of the spherical bearing 210 so as to prevent the same from moving in a lateral direction when clamped and captured in the housing interior space 56.

The lower bearing engaging member 340 is constructed similarly to the top bearing engaging member 338 except that it is configured so as to capture the lower bearing 212 which is preferably in the form of a ring ball bearing. Thus, the lower bearing engaging member 340 has a pair of spaced straight sidewalls 350 and 352. The sidewalls 350 and 352 are interconnected by horizontal top and bottom members 354 and 356 with the top and bottom members 354 and 356 having curved ends which terminate in straight end portions extending to the respective tops and bottoms of sidewalls 350 and 352. With the housing members 18 and 20 attached, the curved ends of the top and bottom members 354a and 354b and 356a and 356b define a diameter slightly smaller than the outer diameter of the ring bearing 212. Thus, with the ring bearing 212 secured and mounted in the lower bearing engaging member 340, the top and bottom members 354 and 356 prevent the bottom ring bearing 212 from moving axially along the longitudinal axis 216.

Extending between the sidewalls 350 and 352 intermediate the top and bottom members 354 and 356 is a horizontal support rib 358 having a curved end terminating at the sidewalls 350 and 352 such that with the housing members 18 and 20 connected together, the intermediate horizontal support rib portions 358a and 358b of each of the housing members define a diameter across their curved ends substantially corresponding to the outer diameter of the ring bearing 212 so as to capture the same against movement in a lateral direction in the housing interior space 56. Thus, with the armature shaft 184 mounted for rotation in upper spherical bearing 210 and the lower ring bearing 212 and with the bearings 210 and 212 clamped in the housing interior space 56 in the pockets formed by the bearing engaging members 338 and 340, the armature 180 along with its commutator 186 will be aligned for rotation on the shaft 184 extending along the longitudinal axis 216.

The cylindrical stator yoke 188 is mounted in the housing interior space 56 so that it encircles the armature core and windings 182 in alignment about the longitudinal axis 216. To mount the cylindrical yoke 188 in alignment about the axis 216, the alignment and support members 214 include horizontal arcuate ledges 360, vertically spaced in the housing members 18 and 20, as best seen in FIGS. 20 and 21. Interconnecting pairs of vertically-spaced arcuate ledges 360 are vertical reinforcing ribs 362. The ledges 360 include uppermost arcuate ledges 364 and lowermost arcuate horizontal ledges 366 which extend horizontally slightly further towards the axis 216 than do the other arcuate ledges 360 therebetween so that when the housing members 18 and 20 are attached, aligned uppermost ledges 364a and 364b in respective housing members 18 and 20 and aligned lowermost ledges 366a and 366b in respective housing members 18 and 20 cooperate to define a diameter which is slightly less than the diameter across the yoke outer surface 218. In this manner, the uppermost ledges 364 extend over the top end surface 368 of the yoke 188 and the bottom ledges 366 extend below the bottom end surface 370 of the yoke 188 so that the yoke 188 is tightly captured between the upper and lower ledges 364 and 366 against axial movement along the longitudinal axis 216.

To capture the yoke 188 against lateral movement in the interior space 56, the intermediate arcuate ledges 360 have a radius of curvature substantially matching the radius of curvature of the cylindrical yoke 188 so that together the arcuate ledges 360 define a diameter substantially the same as the yoke outer surface diameter. As previously mentioned, the housing members 18 and 20 are preferably molded plastic parts and the alignment and support members 214 including the horizontal ledges 360 are preferably integrally formed therewith. In this manner, the arcuate ends of the plastic ledges 360 can resiliently engage the outer surface 218 of the yoke 188 when the housing members 18 and 20 are connected to each other so as to clamp the yoke 188 within the interior space 56 in alignment about the longitudinal axis 216 and in encircling relation to the armature core and windings 182 with the clamping force being transmitted from the force applied in inserting the screws 254 in aligned bosses 48 and 52.

The mounting of the DC motor components directly to the housing members 18 and 20 by the clamping action therebetween provides significant cost savings in the manufacture of the apparatus 10 as the motor assembly 24 no longer needs to be assembled in a separate assembly operation and, instead, can be incorporated into the same assembly operation for the apparatus 10. In addition, the motor assembly 24 does not require the "can" form for the yoke 188 which required an extended yoke having cap and bearing plates to close the cylindrical yoke ends nor does the motor assembly 24 require an independent base or frame for mounting the "can" motor thereto. Typically the rectifier is mounted adjacent to the "can" motor, as on the motor frame, with provision being made to allow the leads from the motor brushes to extend through the motor housing to be electrically connected to the rectifier exterior of the motor housing. Thus, cost savings are obtained by minimizing the time required for assembly as well as by eliminating parts associated with a "can" type motor and allowing for uninterrupted paths for the leads between the brushes and rectifier.

As previously mentioned, preferably the apparatus 10 mounts a pad 46 for buffing, waxing, polishing or the like. In this form, the housing 16 can be provided with a sheath 372 formed at the bottom thereof with the sheath 372 having an annular portion 374 extending outwardly from the bottom 32 of the main housing portion 22 aligned about the longitudinal axis 216. Depending from the annular portion 374 is a circumferential skirt 376 from which the buffer pad 46 can project.

To allow the buffer pad 46 to stably move in an orbital path as it is driven, a counterweight assembly 378 is provided. The counterweight assembly 378 includes a pad mounting post 380 mounted thereto for allowing the pad 46 to be quickly mounted to the apparatus 10 and removed therefrom.

More specifically and referring to FIGS. 16–19, the counterweight assembly 378 includes a flat, elevated mounting portion 382 and a lower counterweight portion 384 offset from the elevated mounting 382. The elevated mounting portion 382 includes a threaded aperture 386 therethrough for receiving the threaded end 208 of the armature shaft 184 projecting through the ring ball bearing 212. Thus, with the armature shaft end 208 threaded in the aperture 386, the counterweight assembly 378 is mounted to the apparatus 10 for rotation with the shaft 184.

The quick-change pad mounting post 380 is connected to elevated mounting portion 382 adjacent the threaded aperture 386 and mounts the buffer pad 46 such that rotation of the counterweight assembly 378 by virtue of the attachment of the armature shaft 184 in the aperture 386 produces a substantially circular orbital path in which the pad 46 is moved about the shaft 184 and thus, the longitudinal axis 216. Since the mounting post 380 will be aligned with the center of the pad 46 as described herein and the shaft 184 is between the post 380 and the counter-weight portion 384, as the counterweight assembly 378 is rotated, the counterweight portion 384 will always be disposed over the smaller portion of the pad as defined by a chord line drawn so as to extend across the circular pad 46 through the shaft 184 and across the width of the counterweight assembly 378. In this manner, the counter-weight portion 384 acts to counter forces generated during rotation of the pad 46 in its orbital path which otherwise would tend to de-stabilize the apparatus 10.

The pad 46 can be of conventional construction and, in a preferred form has a 9-inch diameter. The pad 46 includes a plastic pad mounting plate 388 attached to its top surface. Projecting upwardly from the center of the pad mounting plate 388 is an annular post receiving member 390 having a central bore 392 extending therethrough in alignment with the central axial bore of the pad 46. The central bore 392 can have an axial sleeve 394 fixed therein with an axial lining 396 rotatably mounted in the axial sleeve 394 as by bearings (not shown).

The post 380 has a recess 398 machined near the lower end 400 of the post 380. For removably mounting mount the pad 46 to the quick-change pad mounting post 380, a detent ball 402 attached to a plastic backing 404, such as polyurethane, is secured in the recess 398. The recess 398 has a diameter across its opening slightly larger than the diameter of the detent ball 402 such that the ball 402 is snugly received in the recess 398 when attached therein. With the ball 402 attached in the recess 398 by way of the plastic backing 404, the ball 402 protrudes at a predetermined distance beyond the surface of the post 380 to an extended position. As the ball 402 is mounted on the plastic backing 404, the ball 402 can be depressed by exerting a force on the ball 402 which compresses the plastic backing 404 so that the ball 402 is flush with the surface of the post 380.

To move the detent ball 402 to its depressed position, the axial lining 396 has a diameter substantially the same as the diameter of the pad mounting post 380 so that insertion of the post 380 in the lining 396 causes the lower curved surface portion 406 of the ball 402 to initially engage the upper annular end 405 of the sleeve 394. Continued downward force applied to the counterweight assembly 39B, and thus to the post 380, causes the axial lining 396 to cam over the curved surface portion 406 by application of a predetermined inwardly directed force to move the ball 402 radially inwardly to a position flush with the post surface against the bias provided by the plastic backing 404.

With the ball 402 in its depressed, flush position relative to the post 380, the post 380 can be readily pushed through the axial sleeve 394 until the bottom 408 of the elevated mounting portion 382 rests against the top 410 of the raised annular member 390 with the counterweight portion 384 adjacent thereto. Thus, with the post 380 inserted through the axial lining 394, the pad 46 is in its releasably secured state to the post 380. In the releasably secured state, the lower end 400 extends beyond the axial lining 396 such that the ball 402 no longer is engaged by the axial lining 396. Accordingly, the predetermined force applied to the curved surface portion 406 is removed therefrom so as to allow the detent ball 402 to rebound under the influence of the plastic backing 404 to its extended position beyond the radius of the post 380. The ball 402 is mounted on the post 380 at a predetermined distance from the bottom 408 of the elevated mounting portion 382 and the length of the axial sleeve 394 is also predetermined so that with the pad 46 is releasably secured to the post 408 and the ball 402 in its extended position, the upper curved surface portion 412 will abut against the lower annular end or shoulder 414 of the axial sleeve so that there is no loose space or play between the raised post-receiving member 390 and the counterweight assembly 308.

With the pad 46 mounted to the quick-change pad mounting post 380 having the detent ball 402 thereon and when an operator wants to change pads to go to a different type of pad or because the pad 46 needs replacing due to wear or damage or the like, the pad 46 can quickly and easily be removed from its mounting to the apparatus 10 without requiring substantial time or disassembly which would otherwise complicate the pad changing process. To remove the pad 46, an operator need merely exert a downward force away from the pad mounting post 380 on the pad mounting plate 388 sufficient to cause the lining annular bottom shoulder 414 to cam over the upper curved surface portion 412 so as to urge the ball 402 to its depressed position flush with the post surface against the normal bias of the plastic backing 404. With the ball 402 in its depressed position, continued downward force on the pad mounting plate 388 causes the lining 396 to slide off of the post 380 until the pad mounting plate 388 and the attached pad 46 are disengaged from the post 380.

Although the ball 402 and pad mounting post 380 provide a secure mounting of the pad 46 to the apparatus 10, it is possible that during use of the apparatus 10, a force sufficient to cause the detent ball 402 to move to its depressed position could be applied to the pad 46 and/or pad mounting plate 388. In the event of such an occurrence, the axial lining 396 is provided with an inter mediate circumferential groove 416 spaced above the detent ball 402 to prevent the post 380 from sliding completely through the axial sleeve 394 to the disengaged position.

The circumferential groove 416 has a predetermined radius sized so as to be capable of capturing the detent ball 402 in an extended position where it protrudes beyond the surface of the post 380 as it passes thereover. Thus, with the pad 46 mounted to the post 380 and with an unexpected force applied to the pad mounting plate 388 or the attached pad 46 causing the ball 402 to move to its depressed position within the axial lining 396, continued movement of the post 380 through the axial lining 396 will eventually cause the ball 402 to encounter the groove 416, The urging of the plastic backing 404 will push the ball 402 into an extended position in the circumferential groove 416 and thus arrest continued movement of the post 380 through the sleeve 394 so as to provide substantially fail-safe operation of the apparatus 10 when the pad 46 is secured on the pad mounting post 380.

While there have been illustrated and described various features for use with an electrically-powered waxer or buffer, it will be appreciated that these features can be utilized with other tools. In addition, it will be apparent that numerous changes and modifications will occur to those skilled in the art, and it is intended in the appended claims to cover all those changes and modifications which fall within the true spirit and scope of the present invention.

I claim:

1. A power tool motor assembly including a housing and a motor drive in the housing for driving a working element of the power tool with the assembly adapted to allow for easy and accurate orientation and coordination of the alignment of components of the motor drive relative to each other in the power tool housing, the assembly comprising:

first and second clamshell housing members of the housing which are connectable to each other to define an interior space for the power tool motor and a longitudinal axis extending through the interior space;

an armature having core windings and a rotatable shaft for driving the working element of the tool and being mountable in the interior space with the rotatable shaft aligned along the longitudinal axis;

a substantially cylindrical stator yoke having permanent magnets pressed therein and mountable in the interior space about the longitudinal axis to encircle the armature;

top and bottom bearings mounted on corresponding ends of the armature shaft;

a substantially cylindrical commutator mounted on the armature shaft over the armature core;

a rectifier electrically connected to an AC power source for converting AC power to DC power;

brush assemblies including brush holders and brushes therein electrically connected between the rectifier and commutator for supplying DC power from the rectifier to the commutator;

a support plate including a central commutator receiving space with the support plate retaining the rectifier and fixedly retaining the brush holders and their internal brushes oppositely to each other about the central space and mountable in a separation of 180° about the longitudinal axis with the brushes in contact with the commutator; and alignment and support members on the first and second housing members with the alignment and support members including arcuate ledges for clampingly capturing and fixing the stator yoke in the housing interior space and bearing engaging members which form pockets for capturing the top and bottom bearings in the interior space in alignment about the longitudinal axis when the clamshell housing members are connected to each other, the members further including ribs for engaging and mounting the support plate to orient both the rectifier and brush assemblies in close proximity to the commutator about the longitudinal axis with the brushes in contact with the commutator and spaced from each other by 180° around the cylindrical commutator, wherein the arcuate ledges, pockets and ribs are oriented in the connected housing members so that the relative position between the yoke, armature, commutator and support plate are easily and accurately coordinated for proper electrical functioning of the motor assembly when the motor assembly is captured in the housing interior space.

2. The assembly of claim 1 wherein the alignment and support members are formed integrally with the housing members.

3. The assembly of claim 1 wherein the arcuate ledges are horizontal arcuate ledges having arcuate edges and with the housing members connected to each other the ledges extend from the first and second housing members towards the longitudinal axis with the arcuate edges defining a yoke capturing seat about the longitudinal axis in the interior space.

4. The assembly of claim 3 wherein the cylindrical yoke includes a top end surface and a bottom end surface and the yoke capturing seat includes upper vertically aligned ledges of the housing members which extend over at least a portion of the top end surface and lower vertically aligned ledges of the housing members which extend below at least a portion of the bottom end surface with the housing members connected to each other to tightly capture the yoke between the upper and lower aligned capturing ledges against movement in an axial direction in the interior space.

5. The assembly of claim 4 wherein the yoke includes an outer cylindrical surface extending between the top end surface and the bottom end surface and the arcuate edges clampingly engage the yoke cylindrical surface with the housing members connected to each other to tightly capture the yoke between the arcuate edges against movement in a radial direction in the interior space.

6. The assembly of claim 1 wherein the bearing engaging members include vertically aligned bearing engaging members of the housing members for cooperating to form the bearing pockets including top and bottom pockets having the longitudinal axis extending therethrough with the housing members connected to each other, the aligned bearing engaging members capturing the top and bottom bearings in the respective top and bottom pockets to align the armature shaft along the longitudinal axis and limit armature movement in the interior space.

7. The assembly of claim 1 wherein the supporting plate is a U-shaped support plate having opposed leg portions and a transverse foot portion extending between the leg portions with a brush housing on each leg portion spaced 180° from each other around the commutator and a rectifier well formed in the foot portion including locking means in the well for retaining the rectifier therein.

8. The assembly of claim 7 wherein the leg portions each have outer cutouts to define shoulder portions thereof and the ribs on one of the housing members include a pair of spaced shoulder receiving members with the shoulder receiving members defining notches for receipt of the shoulder portions therein to align and support the U-shaped plate closely adjacent the commutator.

9. A direct current motor assembly for a power tool, the assembly comprising:

first and second housing members connected to each other to define a housing having an interior space for the motor;

an electrical plug receptacle mounted to the housing members having terminals with portions exposed exteriorly of the housing for electrically connecting an alternating current power supply to the power tool;

an armature having core windings and a rotatable shaft mounted to the first and second housing members;

a yoke carrying permanent magnets for creating a permanent magnetic field of the motor and being mounted to the first and second housing members to encircle the armature;

a commutator having a substantially cylindrical outer surface and being mounted to the rotatable shaft spaced above the yoke;

a pair of brushes for receiving a potential drop and for slidingly riding on the commutator outer surface as it rotates on the shaft for electrically connecting the power supply to the armature windings to cooperate with the yoke permanent magnetic field for rotation of the armature shaft;

a rectifier having input terminals electrically connected to the electrical plug receptacle terminals and output terminals electrically connected to the pair of brushes for converting the alternating current from the power supply to direct current for application to the armature windings;

a unitary support plate including a central commutator receiving space and having the brushes and rectifier mounted thereon with the brushes being fixed oppositely to each other about the central commutator receiving space and the plate being mounted in the interior space with the commutator received in the central space to allow the brushes to engage the commutator outer surface accurately spaced 180° therearound; and alignment and support members of the housing members for mounting the armature shaft, yoke and unitary support plate in predetermined positions relative to each other in the housing interior space so that the brushes engage the commutator spaced 180° from each other therearound and the armature windings and magnets cooperate to cause rotation of the armature shaft when the core windings are energized by way of the engagement between the brushes and commutator with the motor electrical fields and location of the brush contacts being precisely coordinated for proper operation of the direct current motor.

10. The assembly of claim 9 wherein the support plate includes a pair of brush housings mounted thereon with the brushes being mounted in the housings and urged into contact exteriorly of the housings with the commutator outer surface.

11. The assembly of claim 10 wherein the support plate has a U-shape having opposed leg portions and a transverse foot portion extending between the leg portions with the brush housings spaced 180° from each around the commutator on each leg portion.

12. The assembly of claim 9 wherein the support plate includes a rectifier well formed therein for securely receiving and retaining the rectifier therein.

13. The assembly of claim 9 including a switch electrically connected to the electrical receptacle terminals and to the rectifier input terminals with the switch being operable to either activate or deactivate the power tool.

14. The assembly of claim 9 wherein the support plate includes at least one lead guiding stake extending therefrom and non-insulated braided lead wires extend from each of the brushes with at least one of the wires directed around the stake to one of the rectifier output terminals to prevent the wires from contacting each other.

15. The assembly of claim 9 wherein the armature rotatable shaft includes top and bottom bearings on respective ends thereof and the first and second housing members are clamshell housing members which are laterally moved into engagement with each other to be connected together and include integral horizontal ledges and integral bearing engaging members which cooperate to clamp and secure the yoke and the top and bottom bearings in the housing interior space.

16. The motor assembly of claim 1 further including internal leads extending completely within the housing interior space from an external AC power supply to the rectifier and from the rectifier to the brushes.

17. The direct current motor assembly of claim 9 wherein the first and second housing members connected together define a longitudinal axis through the housing interior space, and the plug receptacle is mounted to the housing over the commutator with the plug receptacle, commutator and armature shaft being aligned along the housing longitudinal axis.

* * * * *